(12) United States Patent
Burgess et al.

(10) Patent No.: US 11,638,861 B2
(45) Date of Patent: *May 2, 2023

(54) GOLF BAG HAVING LIGHTWEIGHT TOP FRAME WITH THREE-DIMENSIONAL PRINTED STRUCTURES

(71) Applicant: Acushnet Company, Fairhaven, MA (US)

(72) Inventors: Ian Burgess, Tiverton, RI (US); Stephanie L. Howard, Boston, MA (US); Duane Marshall, East Greenwich, RI (US); Brian R. Poirier, Portsmouth, RI (US); Benjamin J. Beck, Boston, MA (US); Ryan Donovan, Newton, MA (US); Jonathan M. Liston, Somerville, MA (US); Michael T. McDuffee, Malden, MA (US)

(73) Assignee: Acushnet Company, Fairhaven, MA (US)

( * ) Notice: Subject to any disclaimer, the term of this patent is extended or adjusted under 35 U.S.C. 154(b) by 245 days.

This patent is subject to a terminal disclaimer.

(21) Appl. No.: 16/689,137

(22) Filed: Nov. 20, 2019

(65) Prior Publication Data

US 2021/0146207 A1  May 20, 2021

(51) Int. Cl.
*A63B 55/40* (2015.01)
*A63B 55/50* (2015.01)
*B33Y 80/00* (2015.01)

(52) U.S. Cl.
CPC .............. *A63B 55/40* (2015.10); *A63B 55/50* (2015.10); *A63B 2209/02* (2013.01); *B33Y 80/00* (2014.12)

(58) Field of Classification Search
CPC ....................................................... A63B 55/40
(Continued)

(56) References Cited

U.S. PATENT DOCUMENTS 1,599,170 A * 9/1926 Fatjo ...................... A63B 55/40
206/315.6
1,838,699 A * 12/1931 Mcmonies ............. A63B 55/40
206/315.6

(Continued)

FOREIGN PATENT DOCUMENTS

DE    202012005084 U1 *  6/2012  ............. A63B 55/00
JP         3210620         5/2017

*Primary Examiner* — Jennifer Robertson
*Assistant Examiner* — Jessica Kavini Tamil

(57) ABSTRACT

The present invention generally relates to golf bags having a lightweight and durable top frame can be made of a lightweight metal and can have different structures. For example, the top frame can have sidewall, open loop, closed loop, or other configurations. The lightweight top frame assembly can have handle and leg sub-assemblies. Three-dimensional printing methods can be used to form structures in the top frame having various shapes and geometric patterns, for example lattice having a top frame (cuff) with club dividers. The walls of the top cuff can be made of a lightweight metal and can have a sidewall, open loop, closed loop, or other structure. The top cuff includes club dividers for storing and organizing the clubs in different compartments. The club dividers can be made of a cord material. The golf bag of this invention is durable, lightweight, comfortable to carry, and easy to use. The golf bag is durable enough to carry clubs, balls, and accessories, and yet, at the same time, the bag is lightweight and flexible. The golfer is able to balance this lightweight bag and distribute the weight of the bag evenly on their shoulders.

22 Claims, 20 Drawing Sheets

(58) Field of Classification Search
 USPC .................................................... 206/315.6
 See application file for complete search history.

(56) References Cited

U.S. PATENT DOCUMENTS

| | | | | |
|---|---|---|---|---|
| 5,474,176 | A * | 12/1995 | Schenkkan | A63B 55/53 206/315.7 |
| 5,996,789 | A * | 12/1999 | Suggs | A63B 55/40 206/315.6 |
| 6,427,835 | B1 | 8/2002 | Chang | |
| 6,652,045 | B1 * | 11/2003 | Jungkind | A63B 55/57 206/315.7 |
| 7,124,887 | B2 * | 10/2006 | Reimers | A63B 55/408 206/315.3 |
| 7,357,251 | B2 | 4/2008 | Vosloo | |
| 7,431,155 | B2 | 10/2008 | Kadoya | |
| 7,617,931 | B2 | 11/2009 | Shiao | |
| 7,686,164 | B2 * | 3/2010 | Quartarone, III | A63B 55/53 206/315.6 |
| 8,365,908 | B2 | 2/2013 | Shiao | |
| 9,421,608 | B2 | 8/2016 | Loudenslager et al. | |
| 2005/0092631 | A1 * | 5/2005 | Campbell | A63B 55/40 206/315.7 |
| 2014/0008254 | A1 * | 1/2014 | Weinmeier | A63B 55/406 206/315.6 |
| 2020/0222770 | A1 * | 7/2020 | Witkoski | A63B 55/40 |

* cited by examiner

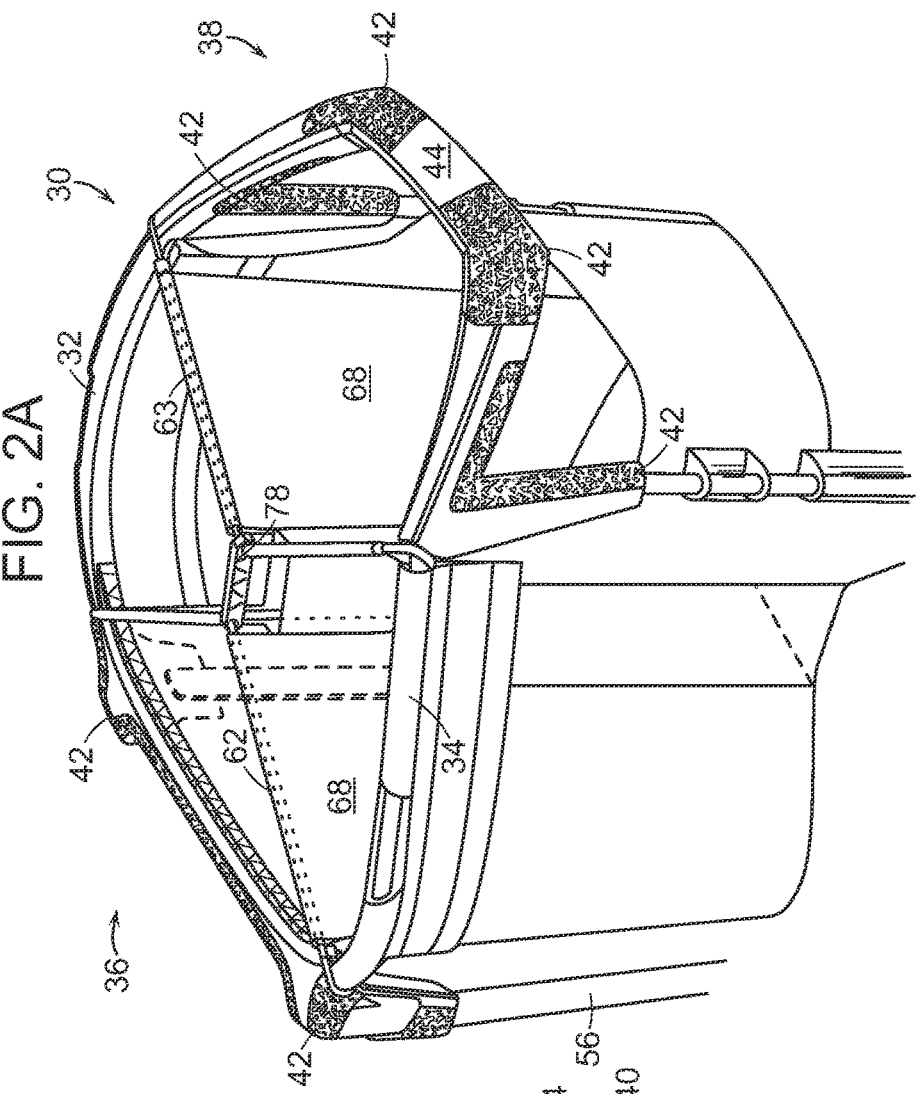
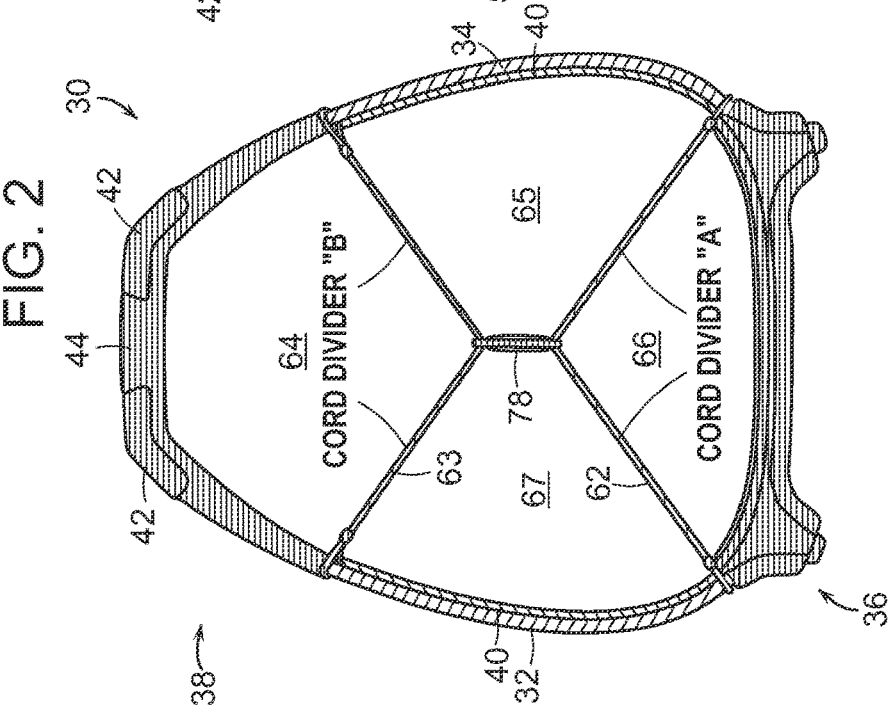

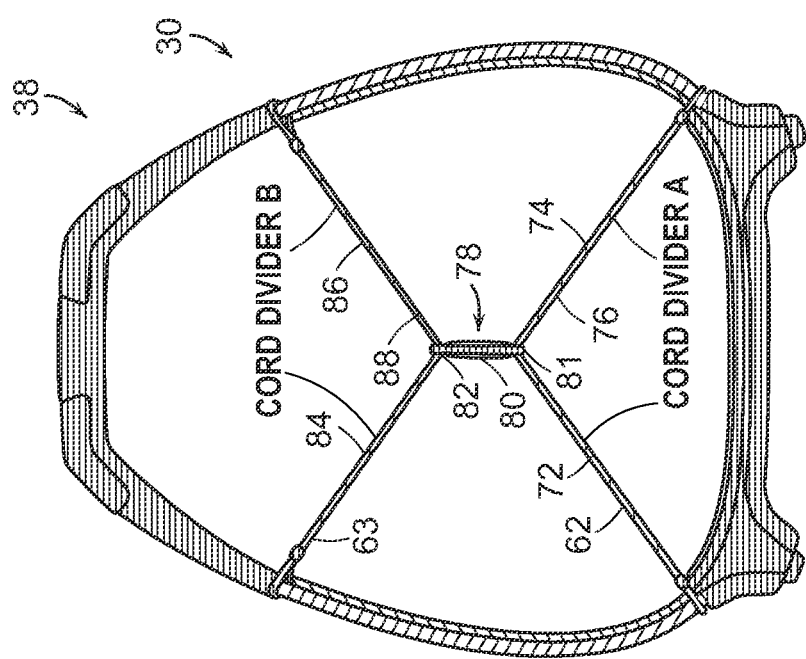

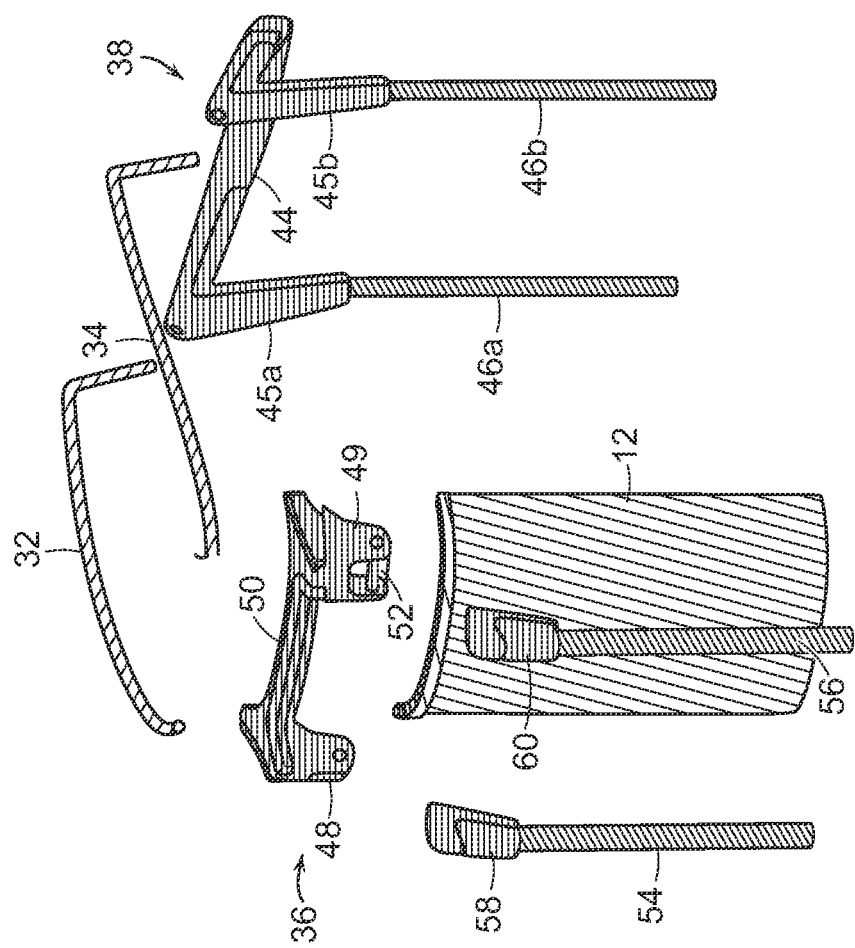

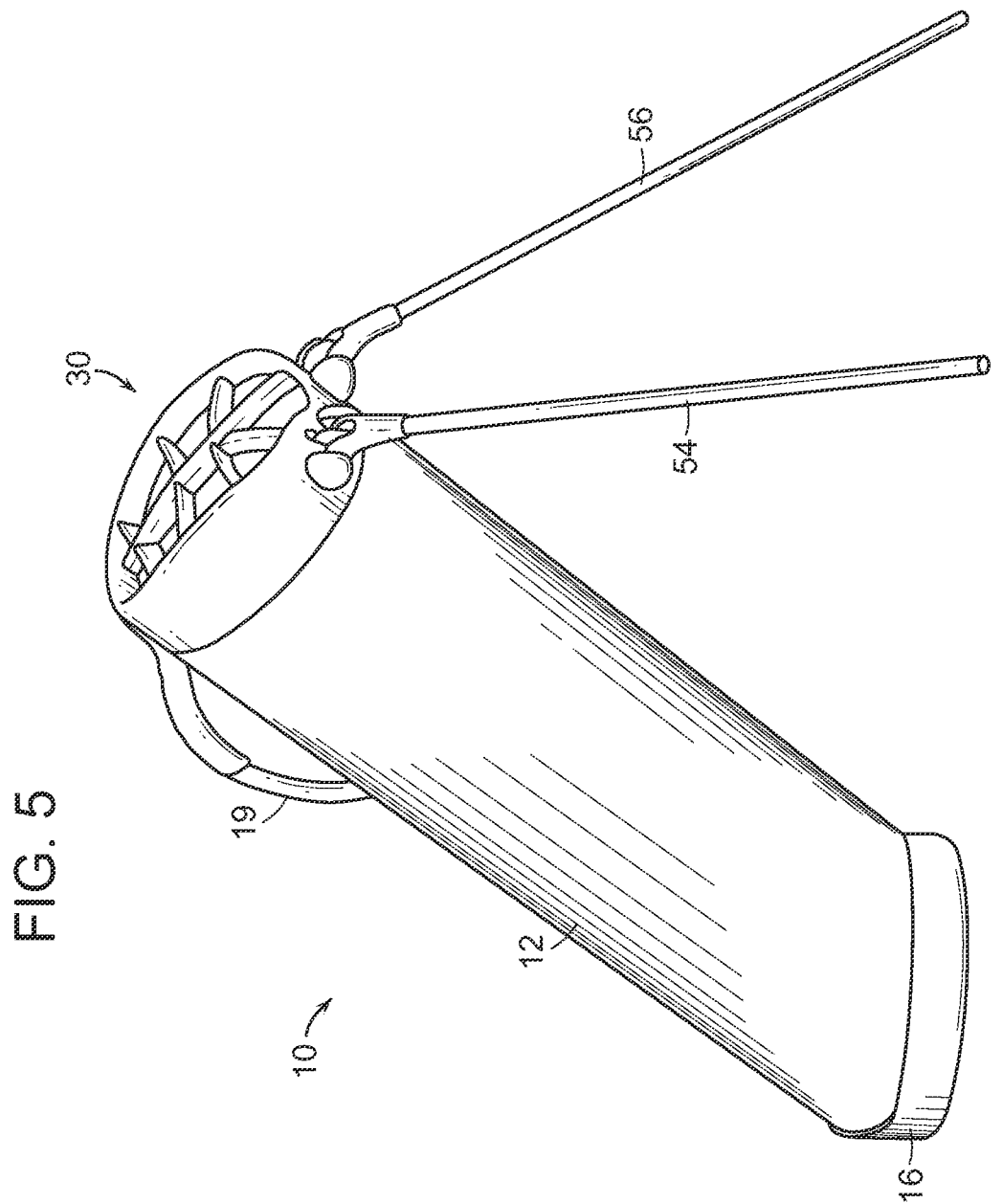

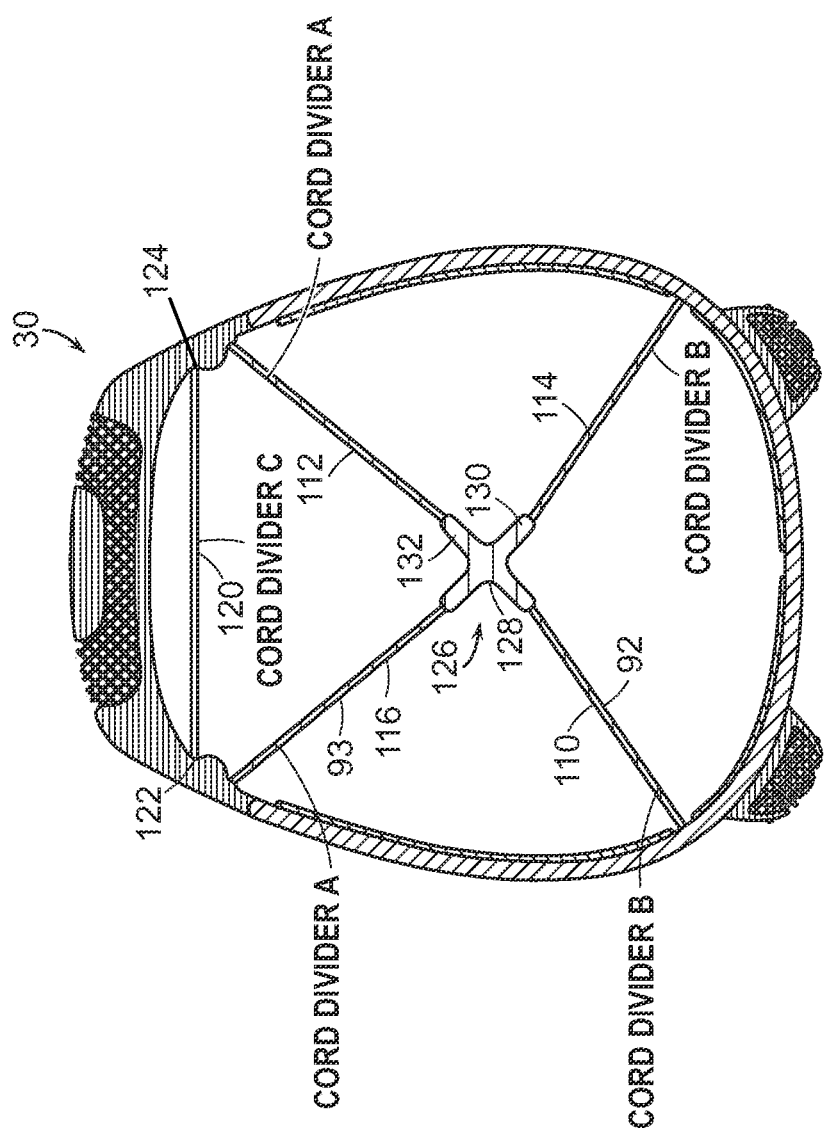

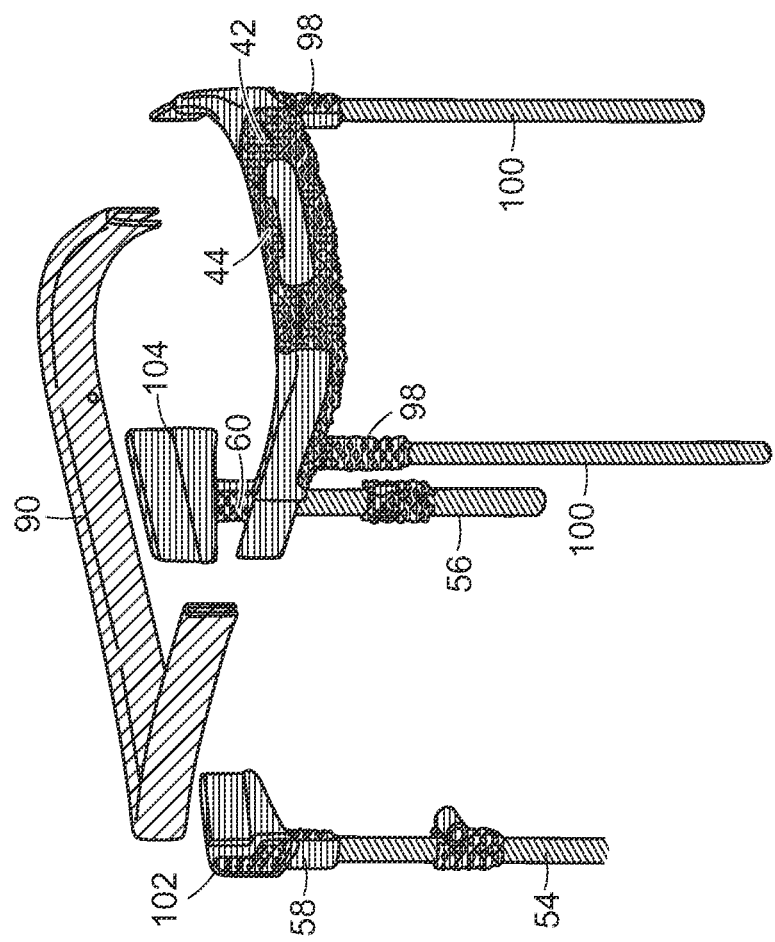

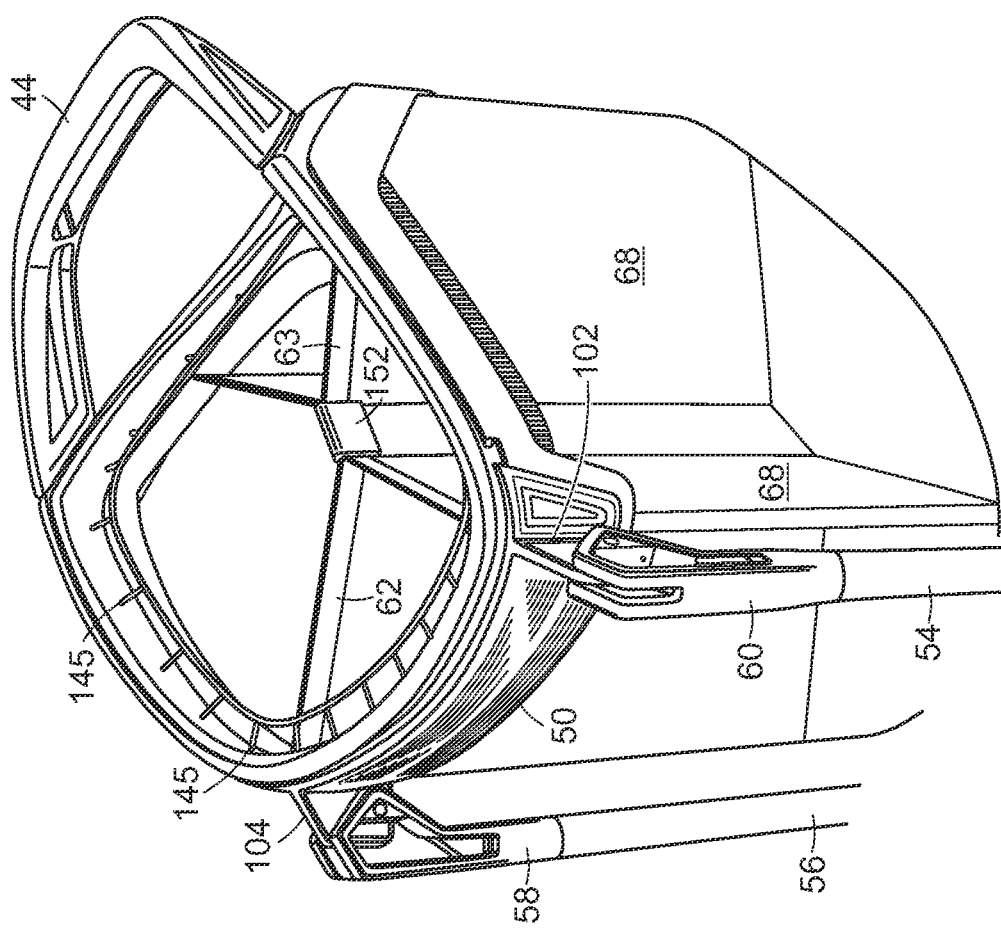
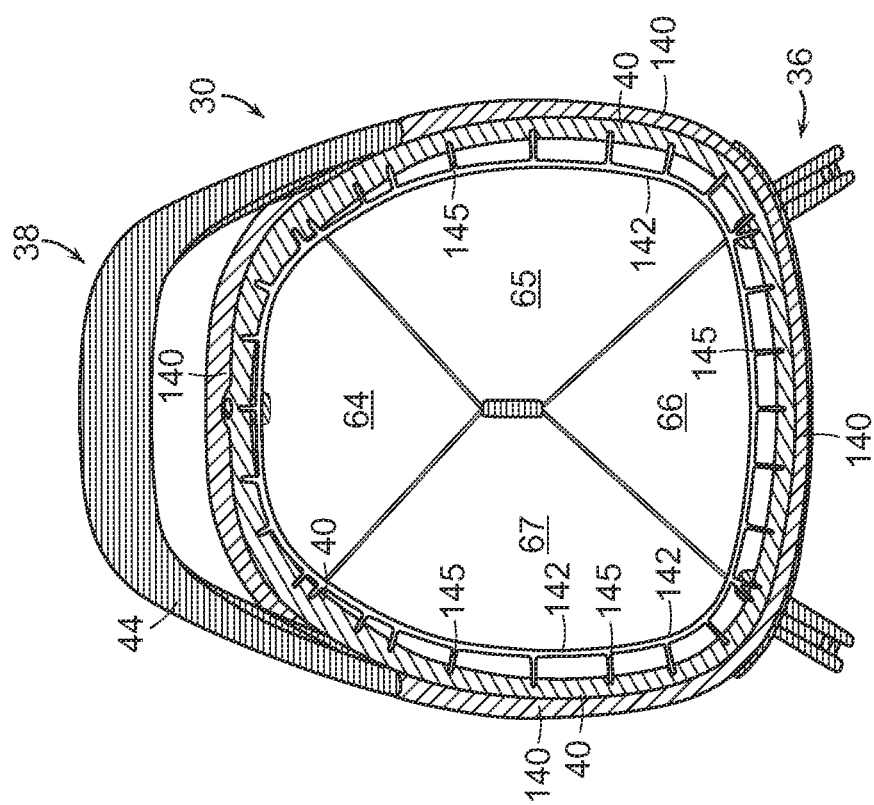

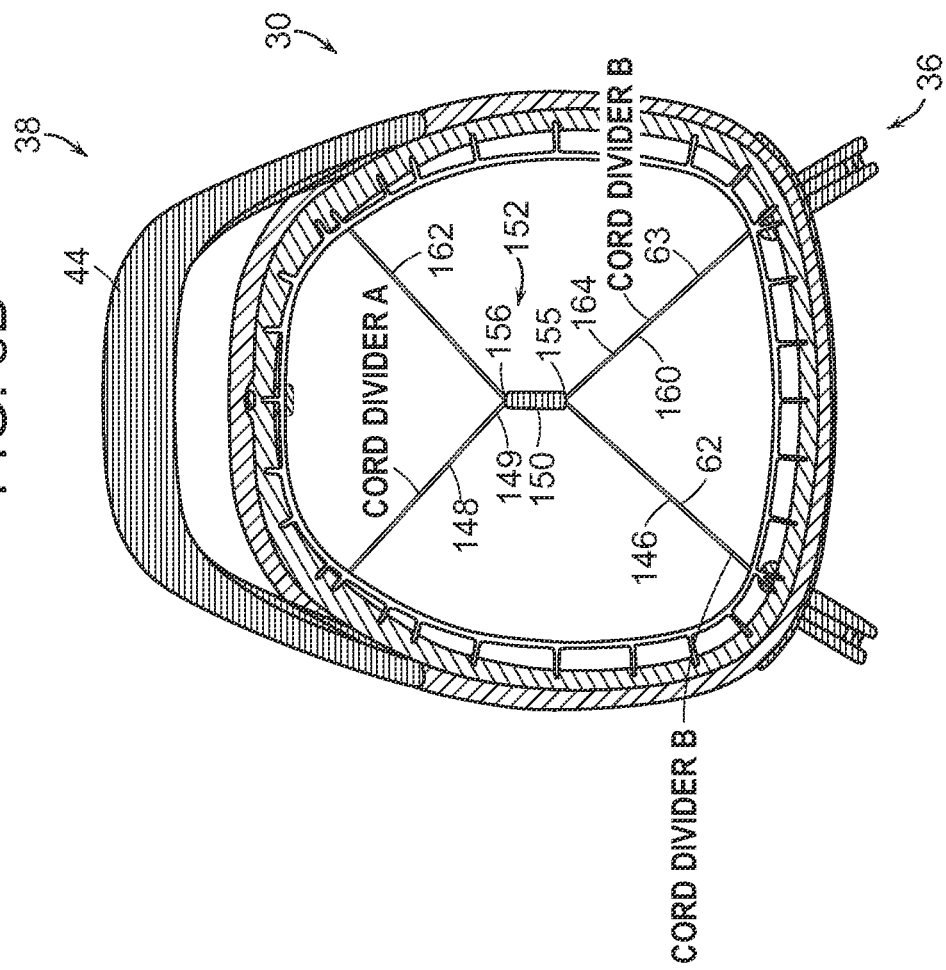

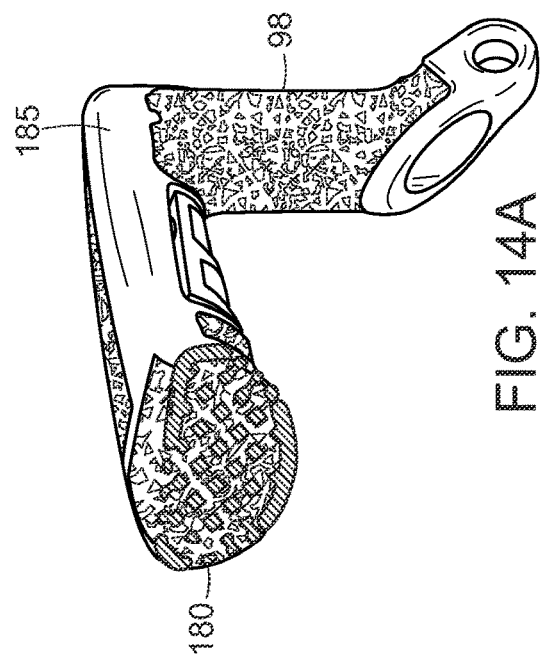
FIG. 14A
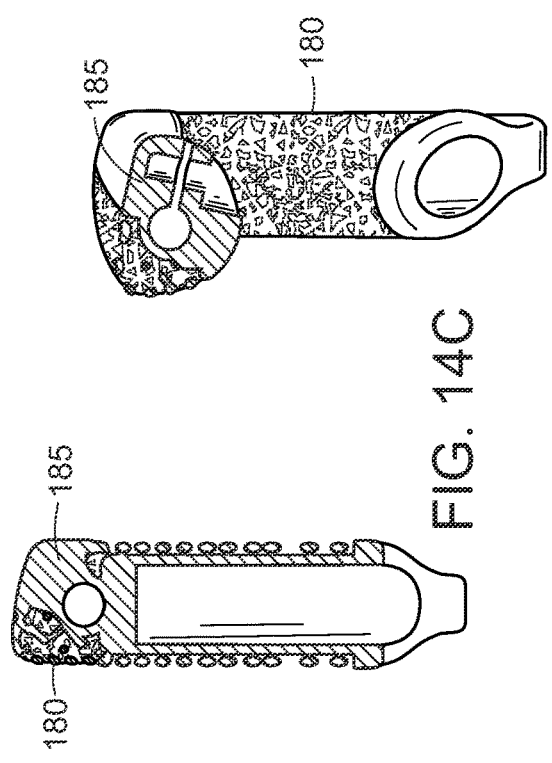
FIG. 14B
FIG. 14C
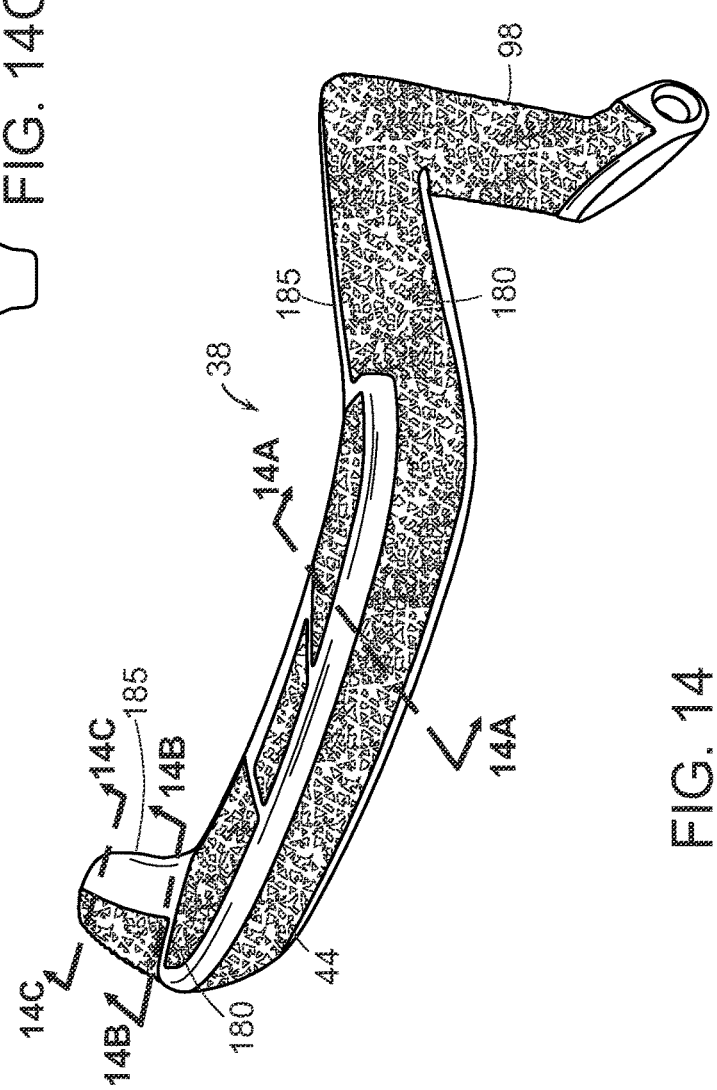
FIG. 14

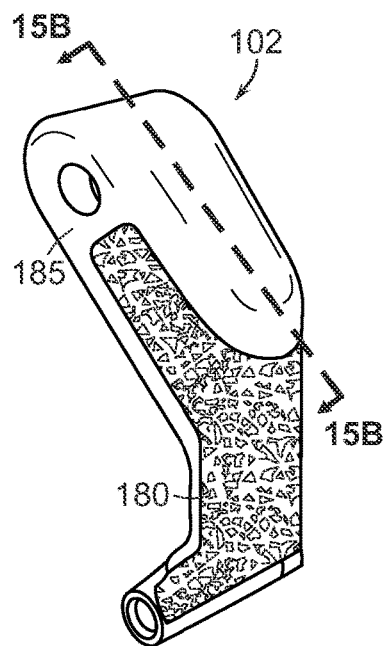
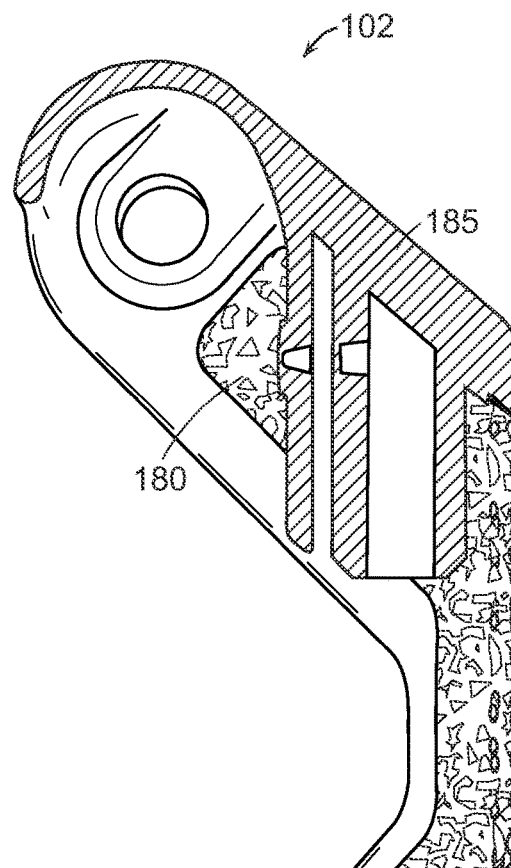
FIG. 15
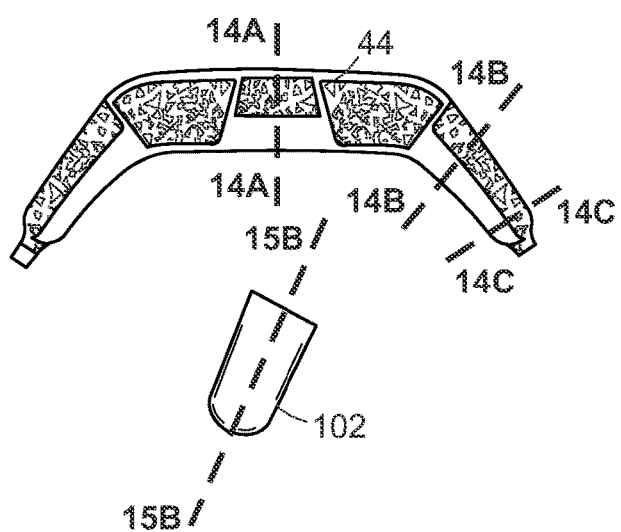
FIG. 15A
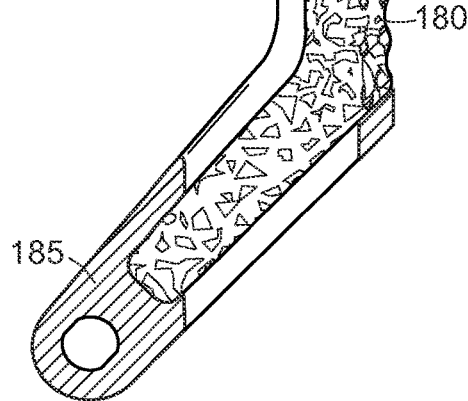
FIG. 15B

GOLF BAG HAVING LIGHTWEIGHT TOP FRAME WITH THREE-DIMENSIONAL PRINTED STRUCTURES

BACKGROUND OF THE INVENTION

Field of the Invention

The present invention generally relates to golf bags having a top frame with club dividers. The top frame can be made of a lightweight metal and can have different structures. For example, the top frame can have sidewall, open loop, closed loop, or other configurations. The lightweight top frame assembly can have handle and leg sub-assemblies. Three-dimensional printing methods can be used to form structures in the top frame having various shapes and geometric patterns, for example lattice structures.

Brief Review of the Related Art

Both professional and recreational golfers use their golf bags for many different purposes today. The bags are normally designed to carry many items including golf clubs and balls, and accessories such as head covers, towels, hats, umbrellas, and golf tees. Many golf courses require that golfers walk the entire course and carry their own bags. Thus, the golfer is constantly placing the bag over his/her shoulders, removing the bag from their shoulders, and placing the bag down or standing-up the bag using a support leg mechanism on the bag. The golfer is also constantly removing clubs from the bag and inserting them back into the bag. Different clubs are used depending upon the golfer's preference and shot being made. Thus, the golf bag needs to be durable, lightweight, comfortable to carry, and easy to use.

Many golf bags have club dividers for organizing and sorting the clubs into different sections of the bag. For example, Chang, U.S. Pat. No. 6,427,835 discloses a golf bag having a top frame containing equally-spaced corrugated longitudinal members; and a bottom frame containing equally-spaced corrugated longitudinal members. Club dividers, which are formed of fabric or a flexible plate material, are connected to the corrugated members of the top and bottom frames. Velcro hook and loop fasteners can be used to fasten the club dividers to the top and bottom frames. In this way, the bag is divided into different sections for organizing the clubs.

Vosloo, U.S. Pat. No. 7,357,251 discloses a golf bag having an outer collar and two sets of arcuate dividers for organizing the clubs. The first set of arcuate dividers may be angled in a first downward direction relative to the top of the top cuff. The second set of arcuate dividers are angled in a downward direction that is opposite from the downward angled direction of the first set of arcuate dividers. Each arcuate divider from the second set intersects at least one arcuate divider from the first set of arcuate dividers along a central axis extending vertically through the top cuff. The downward angled direction of each of the arcuate dividers allows golf clubs, when placed within each compartment, to be carried away from the central portion of the top cuff so that they rest near the outer collar.

Kadoya, U.S. Pat. No. 7,431,155 discloses a caddie bag comprising a top cuff with multiple division plates for organizing the golf clubs. There are right sloping plates which are inclined to a lower right towards a back face side. These plates extend in a rightward direction. There also are left sloping plates which are inclined to a lower left towards a back face side. These plates extend in a leftward direction. The outer ends of the right and left slope plates are connected, respectively, to right and left sides of the opening frame to form sectioned spaces for the clubs.

The golf bag is an important piece of equipment for the golfer who will walk a considerable distance during their round of play. Depending upon the length of the course, speed of play, and other factors, a golfer may walk a few miles in a round. Thus, a golf bag needs to be lightweight and comfortable to carry. The golfer should be able to balance the bag evenly on their shoulders and back so he/she does not feel excess strain. The golf bag needs to allow the golfer to walk naturally and freely. Thus, bag also needs to be durable enough to carry clubs, balls, and accessories, and yet, at the same time, the bag needs to be lightweight and flexible. The golfer needs to be able to organize his/her clubs in the bag, walk comfortably on the course with the bag, and do other golf-specific actions. For example, the golfer should be able to pull any club out of the bag and return it to the bag freely. The present invention provides a golf bag that is durable, lightweight, comfortable to carry, and easy to use and includes other advantageous properties and features.

SUMMARY OF THE INVENTION

The present invention provides lightweight golf bags having a top frame containing club dividers. Preferably, the top frame includes a three-dimensional printed structure. In one embodiment, the invention provides a golf bag, comprising: a) an elongated tubular body for storing golf clubs, the tubular body having a top opening and a closed bottom, and b) a top frame mounted on the top opening. In this embodiment, the top frame comprises: i) a handle sub-assembly having a central handle member with a first end and a second end, the handle sub-assembly extending from a front portion of the top frame; ii) a leg sub-assembly having a central leg support member with a first end and a second end, the leg sub-assembly extending from a rear portion of the top frame; iii) a right sidewall extending from the first end of the handle sub-assembly to the first end of the leg sub-assembly; iv) a left sidewall extending from the second end of the handle sub-assembly to the second end of the leg sub-assembly so that there are two sidewalls opposing each other along the top frame; and v) a plurality of dividers, the dividers extending across the top frame, the dividers defining a plurality of golf club compartments, each compartment configured to receive at least one club.

Preferably, the sidewalls are formed of a lightweight metal material having high mechanical strength such as, for example, aluminum, magnesium, aircraft aluminum, beryllium, carbon fiber, titanium, carbon fiber composites, metal alloys, and the like. Preferably, the top frame has at least one portion formed using a three-dimensional printing process. For example, the top frame assembly can have a handle sub-assembly and leg sub-assembly. The handle sub-assembly can comprise a first support post-holder located at the first end of the handle member for receiving a first support post, and a second support post-holder located at the second end of the handle member for receiving the second support post. In one embodiment, at least a portion of the handle sub-assembly is formed using a three-dimensional printing process. The leg sub-assembly can comprise a first leg support member located at the first end of the central leg support member for receiving a first leg, and a second leg support member located at the second end of the central leg support member for receiving a second leg. In one embodiment, at least a portion of the leg sub-assembly is formed using a three-dimensional printing process.

The club dividers in the top frame can be made from various materials, for example, metals, plastics, woven webbing, cords, wood, and combinations thereof. The club dividers extend across the top frame to form compartments for storing and organizing the golf clubs. In one embodiment, there are four club compartments.

In another embodiment, the golf bag comprises: a) an elongated tubular body for storing golf clubs, the tubular body having a top opening and a closed bottom, and b) a top frame mounted on the top opening, the top frame comprising: i) a handle sub-assembly having a central handle member with a first end and a second end, the handle sub-assembly extending from a front portion of the top frame; ii) a first leg holding bracket for receiving a first leg, and a second leg holding bracket for receiving a second leg, the first and second leg-holding brackets extending from a rear portion of the top frame; iii) an outer wall extending from the first end of the handle and across the first and second leg holding brackets so that it forms an open loop along the top frame; and iv) a plurality of club dividers extending across the top frame. The club dividers can be made of various materials including a cord material. Preferably, the outer wall is made of a lightweight metal material. In one embodiment, at least a portion of the handle sub-assembly is formed using a three-dimensional printing process. For example, the handle sub-assembly can be made from a lightweight metal using a three-dimensional printing process. Also, in one embodiment, at least one of the leg-holding brackets is formed using a three-dimensional printing process.

In yet another embodiment, the golf bag comprises: a) an elongated tubular body for storing golf clubs, the tubular body having a top opening and a closed bottom, and b) a top frame mounted on the top opening, the top frame comprising an outer wall having front, side, and rear portions so that it forms a closed loop along the top frame; iii) a central handle member extending from the front portion of the outer wall; iv) a leg sub-assembly having a central leg support member with a first end and a second end, the leg sub-assembly extending from a rear portion of the outer wall; and v) a plurality of club dividers extending across the top frame. The club dividers can be made of various materials including a cord material. Preferably, the outer wall forming the closed loop structure made of a lightweight metal material. In one embodiment, the central handle portion is made of metal and is formed using a three-dimensional printing process. Also, in one embodiment, at least one portion of the leg sub-assembly is formed using a three-dimensional printing process.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

FIG. 2 is a top view of one embodiment of the top frame for a golf bag of this invention;

FIG. 2A is a perspective view of the top frame for a golf bag as shown in FIG. 2;

FIG. 2B is a second top view of the top frame for a golf bag as shown in FIG. 2A showing the club dividers in detail;

FIG. 3 is an exploded view of the top frame for a golf bag of this invention as shown in FIG. 2A showing the handle sub-assembly and leg sub-assembly in detail;

FIG. 5 is a perspective view of one embodiment of the golf bag of this invention showing the bag in a standing and tilted position;

FIG. 6B is a second top view of the top frame for a golf bag as shown in FIG. 6A showing the club dividers in detail;

FIG. 7 is an exploded view of the top frame for a golf bag of this invention as shown in FIG. 6A showing the handle sub-assembly and leg sub-assembly in detail;

FIG. 8 is a top view of another embodiment of the top frame for a golf bag of this invention;

FIG. 8A is a perspective view of the top frame for a golf bag as shown in FIG. 8;

FIG. 8B is a second top view of the top frame for a golf bag as shown in FIG. 8A showing the club dividers in detail;

FIG. 14 is a perspective view of the handle sub-assembly of the top frame for a golf bag of this invention as shown in FIG. 13;

FIG. 14A is a cross-sectional view of the handle sub-assembly in FIG. 13 along Line 14A-14A';

FIG. 14B is a cross-sectional view of the handle sub-assembly in FIG. 14 along Line 14B-14B';

FIG. 14C is a cross-sectional view of the handle sub-assembly in FIG. 13 along Line 14C-14C';

FIG. 15 is a perspective view of the leg sub-assembly of the top frame for a golf bag of this invention as shown in FIG. 13;

FIG. 15A is a top view of the handle and leg sub-assembly of the top frame for a golf bag of this invention as shown in FIG. 13;

FIG. 15B is a cross-sectional view of the handle sub-assembly in FIG. 15 along Line 15B-15B'.

DETAILED DESCRIPTION OF THE INVENTION

Figure 1:
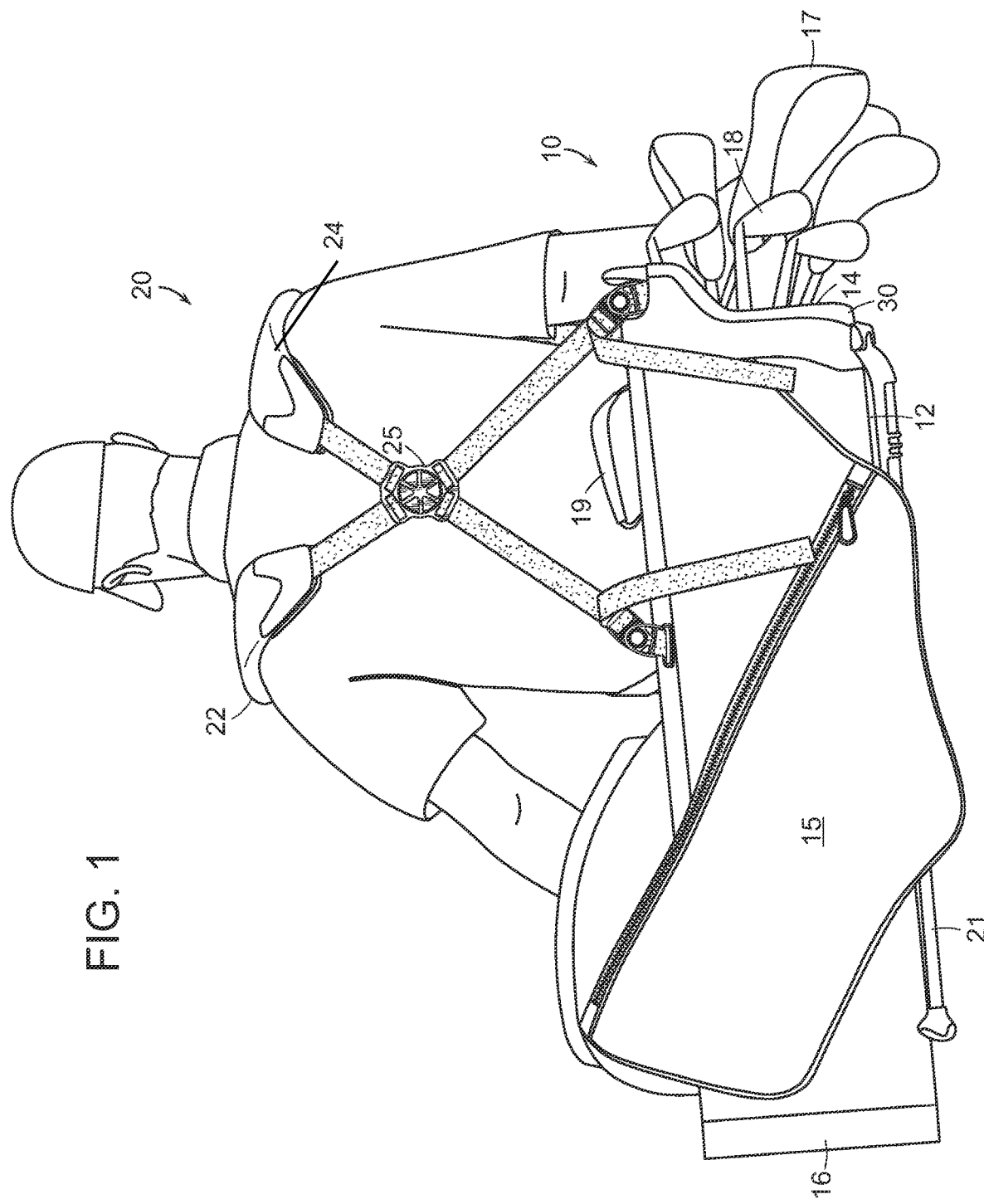
FIG. 1 is a rear perspective view of a person carrying one embodiment of the golf bag of this invention, wherein the person is using two shoulder straps to carry the bag.

Referring to FIG. 1, the golf bag (10) generally includes an elongated tubular body (12) having an open end (14) and an opposing base (16). The sidewall of the tubular body (12)

may include zippered pockets (15) for golf balls and accessories such as apparel, towels, hats, gloves, golf tees, beverages, and the like. Golf clubs (18) can be placed in the tubular body (12) so that they are projecting from the open-end (14) of the golf bag (10). Some of the golf clubs may be protected with head covers (17). The tubular body (12) may further include a handle (19) for lifting and carrying the bag and a leg system (21) for supporting the bag in a standing position as described further below. The tubular body (12) can be made of any suitable textile material including leather and woven/non-woven fabrics.

The bag (10) can further contain a shoulder strap system (20), for example, a two-strap system, wherein the golfer can bear the weight of the bag on both shoulders. The first strap (22) fits over a person's left shoulder and the second strap (24) fits over the right shoulder. These dual shoulder straps (22, 24) tend to help improve the weight distribution of the bag and less weight stress is placed on each shoulder. Other bags use a single-strap system, wherein the strap fits over one shoulder. In this way, the golfer or caddie can carry the bag and slip it off using either the left or right shoulder. In yet other bags, a convertible shoulder strap system (20), as shown in FIG. 1, is used. This strap system includes a strap connector (25), where the straps (22, 24) extend through diagonally opposed slots and criss-cross each other. The straps (22, 24) can be easily changed back and forth between a two-strap and single-strap system assembly by simply loosening and pulling away one strap from the strap connector (25). For example, if the golfer wishes to use only strap (22) and carry the bag (10) over the left shoulder, he/she removes the other strap (24) from the strap connector (25) and lets it hang loosely or stores it in a pocket. The golfer then uses the strap (22) over the left shoulder to support the weight of the bag (10). The strap system used on the golf bags of this invention help the golfer balance the bag evenly on their shoulders and back. The strap systems are comfortable and easy to use so the golfer can walk naturally and freely even when carrying these bags over the entire course.

The top frame (30) is positioned on the top opening (14) of the bag (10). The top frame (30) is constructed to provide some rigidity to the bag (10). The top frame (30) helps maintain the shape of the bag (10) when the bag is in a standing position or resting on the ground. As described in further detail below, the top frame (30) also helps to organize and protect the clubs in the bag.

Top Frame Having Separate Sidewalls

Referring to FIGS. 2, 2A, and 2B, in one embodiment, the top frame (30) includes a first sidewall (32) and an opposing second sidewall (34). The top frame further includes a rear-side leg sub-assembly (36) and a front-side handle sub-assembly (38). The top frame (30) forms the top cuff (collar) of the bag.

The first and second sidewalls (32, 34) of the top frame (30) are preferably formed of a lightweight material having high mechanical strength such as, for example, aluminum, magnesium, aircraft aluminum, beryllium, carbon fiber, titanium, carbon fiber composites, metal alloys, and the like. These materials help reduce the overall weight of the bag (10). For example, fiber-reinforced composites comprising a binding matrix (resin) and reinforcing fiber can be used. The binding polymer can be a thermoset material such as epoxy or rubber. Thermoplastic resins such as polyesters, polyolefins, nylons, and polyurethanes also can be used. Preferably, carbon fiber is used as the reinforcing fibers. Other fibers such as aramids (for example, Kevlar™), aluminum, or glass fibers can be used in addition to or in place of the carbon fibers. The fiber-reinforced composites can be manufactured using standard techniques, where the reinforcing fibers are impregnated with a resinous material, such as epoxy. This resin is used as a matrix to bind the reinforcement fibers. These impregnated materials may be laid-up to form a laminate structure which is cured at high temperatures to solidify the composite material. The resulting fiber-reinforced composite is lightweight and has excellent mechanical properties such as high stiffness, high tensile strength, and a low weight-to-strength ratio.

The inside surface of the sidewalls (32, 34) can be lined with a layer of fabric or foam padding material (40). In one embodiment, a textile fabric layer containing an underlying cushion or pad (40) attached to the inside surfaces of the sidewalls (32, 34). Foams, natural and synthetic leathers, natural and synthetic rubbers, woven and non-wovens, and natural and synthetic fabrics can be used. The textile fabric layer (40) can be made of any suitable natural or synthetic fabric. For example, synthetic textile fabrics made from nylons, polyesters, polyolefins, polyurethanes, rubbers, and combinations thereof can be used. Canvas fabrics also can be used. Foamed materials are particularly preferred for constructing the underlying cushioned layer.

The fabric and foam padding materials lining the inside of the sidewalls (32, 34) of the top frame (30) help minimize damage to the golf clubs. In another embodiment, the textile layer containing an underlying cushion or pad (40) is wrapped over the sidewalls (32, 34) so that is attached to the outer surface of the sidewalls also. The textile layer (40) can be attached to the sidewalls (34, 34) of the golf bag (10) with adhesive, rivets, screws, fasteners, sewing or stitching over, or any other suitable attachments means.

As shown in FIGS. 2, 2A, 2B, and 3, the leg sub-assembly (36) and handle sub-assembly (38) may include a three-dimensional (3D) printed structure (42). Three-dimensional printing is described in further detail below. The handle (44) is integral to the top cuff (30) and forms an opening where a person can insert his/her hand through and grasp the handle. The handle (44) may include two support post-holders (45a, 45b) for receiving support posts (46a, 46b) that can be made from metal, carbon fiber composites, and the like. Although the golf bag (10) is primarily described and illustrated herein as having a single integrated handle (44) in the top cuff (30), it is recognized that the bag can have any number of handles. The number of handles shown in the Figures herein are for illustration purposes only. The number of handles may vary without departing from the scope of the invention.

Figure 4:
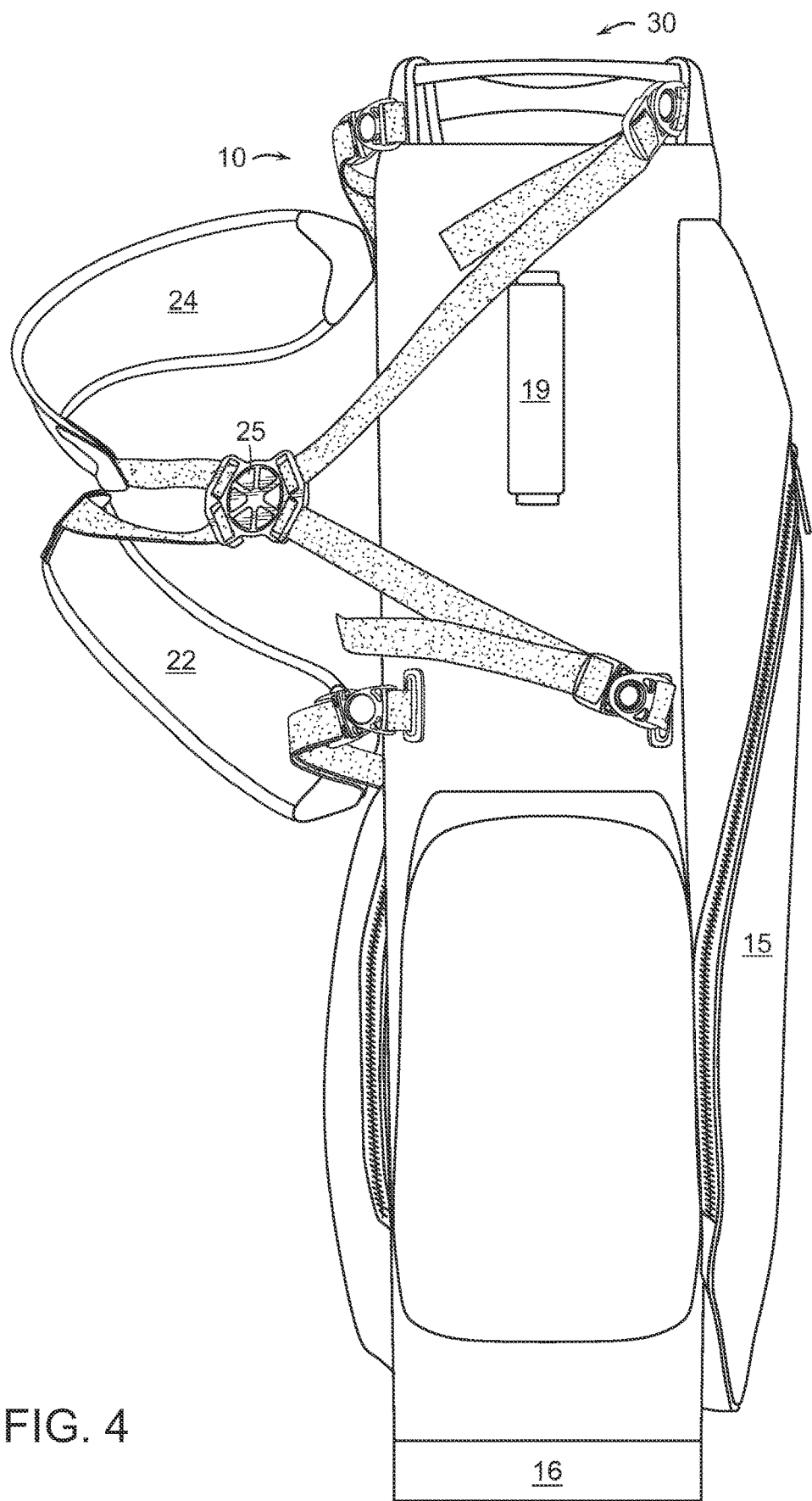
FIG. 4 is a front perspective view of one embodiment of the golf bag of this invention showing the bag in a standing and upright position.

As shown in in FIG. 3, the leg sub-assembly (36) may include two leg-support members (48, 49) and a central support member (50). The leg-support members (or seats) (48, 49) have a pin (52) that is inserted between the walls of each support member (48, 49). The legs (54, 56) include upper connectors (58, 60) for coupling the legs to the leg-support members (48, 49). A pin (52) is inserted between the walls of the support members (48, 49) so that the legs (54, 56) can pivot outwardly and support the bag in a tilted, standing position. In operation, the support legs (54, 56) of the golf bag are normally in their retracted position, and the bag (10) is supported by the base (16). Referring to FIG. 4, the golf bag (10) is shown standing on the ground in an upright and vertical position. When a person presses downwardly on the top cuff (30) of the bag, the support legs (54, 56) are pushed outwardly. The base (16) pivots and this forces the legs (54, 56) into their extended position. As shown in FIG. 5, the extended legs (54, 56) support the bag (10) as it stands in a slightly tilted position. This makes the golf clubs (not shown) in the top frame (30) easily accessible. With the bag (10) in this propped-up position, the golfer can see all of the different clubs and select the appropriate club for a given shot.

In another embodiment, as discussed and illustrated further below, the top frame (30) is formed from a thin, lightweight one-piece metal wire. In this version of the golf bag (10), this metal wire also serves as the pin or pivot point for the leg support members and legs that extend outwardly when propping the bag in tilted position and that are pushed inwardly when the bag is standing upright.

Referring back to FIG. 2, the top frame (30) may contain one or more club dividers (62, 63). The top frame dividers separate the interior of the golf bag into different compartments (64, 65, 66, and 67). One or more golf clubs may be inserted into each compartment. In this way, the clubs can be organized and the individual compartments can protect the clubs. The compartments (64, 65, 66, and 67) keep the clubs separated and prevent them from knocking into each other. In golf bags that do not contain dividers or interior compartments, the clubs can knock into each other when lifting, carrying, and placing the bag down. This handling of non-club divider bags can cause nicks, scratches, and even more severe damage to the clubs as they are jostled about. The top frame dividers (62, 63) may be constructed from woven webbing, cord, plastic, metal, fiber composite materials, hardwood, or combinations thereof. In one preferred embodiment, the dividers are constructed from a lightweight cord material as described further below.

It is recognized that the number of top frame club dividers (62, 63) and compartments (64, 65, 66, and 67) may vary without departing from the scope of the invention. That is, the bag may contain any desired number of club dividers, for example, two, three, four, or five, and the like. In this way, the bags can be customized to contain a desired number of club dividers and compartments. The golfer can personalize his/her bag depending upon their preferences. The club dividers are configured to extend across the top frame in different directions to form separate compartments for the clubs. For example, as shown in FIGS. 2-2B, the bag may contain two club dividers (62, 63) that extend across the top frame to form four separate compartments (64, 65, 66, and 67).

Although the top cuff (30) is primarily described and illustrated herein as having four separate compartments (64, 65, 66, and 67), it is recognized that this number of compartments is for illustration purposes only. The number of compartments may vary without departing from the scope of the invention. For example, the golf bag (10) may contain only two or three compartments. In other instances, the golf bag may contain five or six compartments. In still other instances, the golf bag may contain fourteen separate compartments. The rules of golf allow a golfer to fourteen clubs so such a bag would allow the golfer to store one club in each compartment. One advantage of the present invention is that the bags can be customized to contain any desired number of compartments. That is, one golfer may prefer to carry a bag containing only two compartments, and the bag may be tailored to have this number of compartments. Another golfer may prefer to carry a bag containing five compartments, and the bag may be tailored to have such a number of compartments.

In one embodiment, the same textile fabric layer containing an underlying cushion or pad (40), which is attached to the inside surfaces of the top frame's sidewalls (32, 34), as described above, is also used to cover the top frame's dividers (62, 63). The padding (40) is used to provide additional padding for the dividers and to protect the clubs. In another embodiment, different materials may be used to cover the outer walls and dividers. As shown in FIGS. 2A, the partition walls (68) which extend downwardly from the top frame dividers (62, 63) to the base of the bag (10) also can be made of the same fabric material. In this way, the top frame (30) and interior of the bag (10) have a uniform look and texture. In other embodiments, the partition walls (68) and top frame dividers (62, 63) can be made or covered with a different material. In still another embodiment, the partition walls (68) may extend only partially along the inside length of the bag (10). In yet another embodiment, the bag may include the top frame dividers (62, 63) without any partition walls extending downwardly.

Three-Dimensional Printing

As discussed above, the leg and handle sub-assemblies (36, 38) can have three-dimensional (3D) printed structures (42) made using three-dimensional additive manufacturing systems. In general, additive manufacturing refers to systems that use three-dimensional (3D) digital data from an object to build-up the object by depositing metal, plastic, or other material layer-by-layer as opposed to subtractive systems used to build-up the object by removing material (for example, machining/milling an object from a solid block of polymer material or metal). In these systems, computer software is used to collect digital data on the shape and appearance of a real object. A digital model is created and a series of digital cross-sectional slices of the model are taken.

These additive manufacturing systems can be used to produce intricate structures and designs on the top frame assembly of this invention, particularly the leg and handle sub-assemblies (36, 38). For example, the leg and handle sub-assemblies may contain three-dimensional printed circular, oval, triangular, square, pentagonal, hexagonal, heptagonal, and octagonal, and the like structures and designs. 3-D printing methods can be used to form structures having various geometric shapes and patterns These shapes can be in arranged randomly or in a geometric order, for example, in a grid or lattice. Also, there can be ridges, bumps, nubs, hooks, ribs, protrusions, projections, and the like extending from the surfaces of the leg and handle sub-assemblies (36, 38). These projections and protrusions can have any suitable shape and dimensions, and be arranged in any desired pattern. A wide variety of geometric shapes such as spherical, elliptical, star, diamond, pyramid, arrow, conical, blade-like, rod, and the like also can be produced. The 3-D printing and other additive manufacturing systems can be used to personalize the golf bag with symbols, logos, names, initials, letters, numerals, and other indicia.

Generally, in a three-dimensional (3D) printing system, each slice is reconstructed by depositing a layer of the material and then solidifying it. The digital information is sent to the three-dimensional printer that successively adds thin layers of material (for example, a powder), until the object is produced. The layers are joined together in various ways, and different materials, for example, metal, plastic, ceramic, or glass). For example, in a three-dimensional (3D) printing process, an inkjet printer head can spray a thin layer of liquid plastic onto a build tray. The liquid layer is cured and it solidifies by irradiating it with ultraviolet (UV) light. The build tray is lowered by a layer, and the process is repeated until the model is completely built. In another 3D printing process, powder is used as the printing medium. The powder is spread as a thin layer on the build tray, and then it is solidified with a liquid binder. In Fusion Deposit Modeling (FDM), the nozzles trace the cross-section pattern for each particular layer. An extrusion head deposits a thin layer of the molten thermoplastic material onto a platform. The molten material hardens prior to application of the next layer. In Multi-Jet Modeling (MJM), a printing head that can move in multiple directions (x, y, and z coordinates) includes multiple small jets that apply the thermoplastic material to a platform layer-by-layer, and the material solidifies. In selective laser sintering (SLS), small powder particles are deposited in the desired pattern and then a laser is used to fuse the powder particles together. Other systems include laminate object manufacturing (LOM) and rapid prototyping. In stereolithography (SLA), liquid resin is applied to an elevator platform. The object is built layer-by-layer. For each layer, a laser beam traces a cross-section pattern of the object on the surface of the liquid resin. After the pattern has been traced, the elevator platform descends by the appropriate distance and the process is repeated. The platform is re-coated with liquid resin, and another pattern is traced. In this way, the layers are joined together and the object is built layer-by-layer. After the object is built, it is cleaned of any excess resin by immersing it in a chemical bath and the object is subsequently cured in an ultraviolet oven.

In one method of this invention, a three-dimensional piece is made according to an ink-jet printing method including the following steps. Digital Information is provided for making the piece and this information is sent to a three-dimensional ink-jet printer. The ink jet printer sprays a metal material onto a support platform according to the digital information. A binder such as powder may be used with the metal material. The support platform is lowered by a precise level of thickness for the layer, and the process is repeated until the three-dimensional piece is formed. The metal material may be applied to a support or building layer if needed. After the final three-dimensional piece is formed, the support layers are optionally washed out with either water or solvent. Since different metal materials can be loaded into the ink-jet printer and different spray nozzles can be used to apply the material, the final three-dimensional object can be formed from more than one material. The final three-dimensional object can comprise different materials.

In another system, a three-dimensional (3D) piece can be made according to a continuous liquid interface printing method that includes the following steps. First, cross-sectional digital information for making the piece is sent to a light-processing digital imaging unit. The method uses a bath member (for example, basin) having a bottom surface with an oxygen-permeable, ultraviolet (UV) light-transparent window is used. The bath contains a UV-light polymerizable liquid resin. The digital imaging unit is used to project a continuous sequence of UV light images through the window of the bath according to the digital information. In this way, the digital information for making the three-dimensional object is illuminated and transmitted to the liquid resin. The illuminating UV light causes the liquid resin to solidify and form the three-dimensional piece on a support plate located above the bath. The construction of the piece is defined by the cross-sectional digital images. The three-dimensional piece grows on the support plate by continuously elevating the plate and drawing the object out of the resin bath while the imaging unit sends new UV images to the resin bath.

In contrast to 3D ink-jet printing, where there are many separate and discrete steps needed to build-up the part layer-by-layer, this liquid interface printing process goes non-stop and does not build by layers. In this liquid interface process, the print speed is basically controlled by the polymerization rate and viscosity of the liquid resin. This continuous liquid interface printing process for making three-dimensional objects is generally described in the patent literature including, DeSimone et al., U.S. Pat. Nos. 9,216,546; 9,211,678; 9,205,601; and Published US Patent Applications 2015/0072293 and 2014/0361463, the disclosures of which are hereby incorporated by reference. Continuous liquid interface printing systems are available from Carbon 3D, Inc. (Redwood City, Calif.).

Cord Dividers

In one preferred embodiment, the top frame (30) includes at least one cord club divider. For example, the cord club dividers (62, 63), as discussed above, can be made of a cord material and referred to as "cord dividers." The cord dividers can be made of a yarn, rope, webbing or other textile material. Polyamides (nylons), aramids, polyesters, polyolefins, and the like can be used to make the cord dividers. In other embodiments, the dividers are made from carbon fiber, carbon fiber composites, or a metal material such as a metal wire and the like. The cord dividers are preferably made of a lightweight and strong material. The cord dividers separate the golf bag into different compartments for storing the golf clubs. As discussed above, these individual compartments organize and protect the clubs from being damaged.

The bag may contain one or more cord club dividers. For example, in some embodiments, the bag contains multiple cord dividers. Each cord divider is a separate and distinct component. In this embodiment, the separate cord dividers are configured to extend across the top frame in different directions to form separate compartments for the clubs. For example, as described and illustrated further below, the bag may contain two cord dividers that extend across the top frame to form four separate compartments. It is recognized that the number of cord dividers may vary without departing from the scope of the invention. That is, the bag may contain any desired number of cord dividers, for example, two, three, four, or five, and the like. As discussed above, in this way, the bags can be customized to contain a specific number of cord dividers and compartments.

In other embodiments, a single cord club divider is used. The cord divider is a continuous and unitary cord loop. In this embodiment, the single, integral cord is configured to extend across the top frame in various directions to form separate club compartments. For example, as described and illustrated further below, the bag may contain a single cord divider that is looped across the top frame to form four separate compartments. The unitary cord consists of cord segments that are arranged in geometric patterns and shapes across the top frame to form the club compartments.

More particularly, referring back to FIGS. 2-2B, the cord divider (62) can be referred to as Cord Divider "A." In general, Cord Divider A is single cord that includes three segments. Cord Divider A includes a first end segment (72) with a loop at its end for attaching this segment to the top frame (30). Cord Divider A also includes an opposing second end segment (74) with a loop at its end for attaching this segment to the frame. The point where the first segment (72) is attached to the top frame (30) can be referred to as the first frame attachment point. The point where the second segment (74) is attached to the top frame (30) can be referred to as a second frame attachment point. In this embodiment, the first and second end segments (72, 74) are fastened to the top frame (30) by small loops at their respective ends. It is recognized, however, that the first and second end segments (72, 74) can be attached to the top frame (30) by other means such as, for example, clips, connectors, tie-downs, clasps, buckles, shackles, spring-loaded clips, snap buttons, laces, ties, button/button holes, hook and loop fastener fabric such as Velcro™, and any other suitable fastening means.

Cord Divider A also has a third segment, an intermediate segment (76), that extends through a connector piece (78). Referring to FIG. 2B, the connector piece (78) is shown having a housing (80) with two channels (81, 82). One channel (81) is located on one end of the housing (80); and the other channel (82) is located on the opposing end of the housing (80). The channels (81, 82) are adapted for passing the cords through. The intermediate segment (76) of Cord Divider A passes through one channel (81).

The other cord divider (63) can be referred to as Cord Divider "B". In general, Cord Divider B is also a single cord that includes three segments. Cord Divider B includes a first end segment (84) with a loop at its end for attaching this segment to the top frame (30). Cord Divider B also includes an opposing second end segment (86) with a loop at its end for attaching this segment to the top frame (30). The point where the first end segment (84) is attached to the frame (30) can be referred to as the third frame attachment point. The point where the second end segment (86) is attached to the frame (30) can be referred to as a fourth frame attachment point. It is recognized, however, that the first and second end segments (84, 86) can be attached to the top frame (30) by any other suitable fastening means such as, for example, clips, connectors, tie-downs, clasps, buckles, hook and loop fasteners and others as described above. Cord Divider B also contains a third segment, an intermediate segment (88), that extends through the connector piece (78). As discussed above, the intermediate segment (76) of Cord Divider A passes through one channel (81); and the intermediate segment (88) of Cord Divider B passes through the second channel (82) of the same connector piece (78).

Top Frame Having an Open Loop

Turning to FIGS. 6, 6A, 6B, and 7, in a second embodiment, the top frame (30) includes an outer wall (90) that forms an open loop. That is, the outer wall (90) has a horseshoe-like structure. The top frame (30) further includes a rear-side leg sub-assembly (36) and a front-side handle sub-assembly (38). The top frame (30) forms the top cuff (top collar) of the golf bag (10).

The outer wall (90) (open loop) of the top frame (30) is preferably formed of a lightweight material having high mechanical strength such as, for example, aluminum, magnesium, aircraft aluminum, beryllium, carbon fiber, titanium, carbon fiber composites, metal alloys, and the like. These materials help reduce the overall weight of the golf bag (10). The inside surface of the outer wall (90) can be lined with a layer of fabric or foam padding material (40) as described above.

Figure 6A:
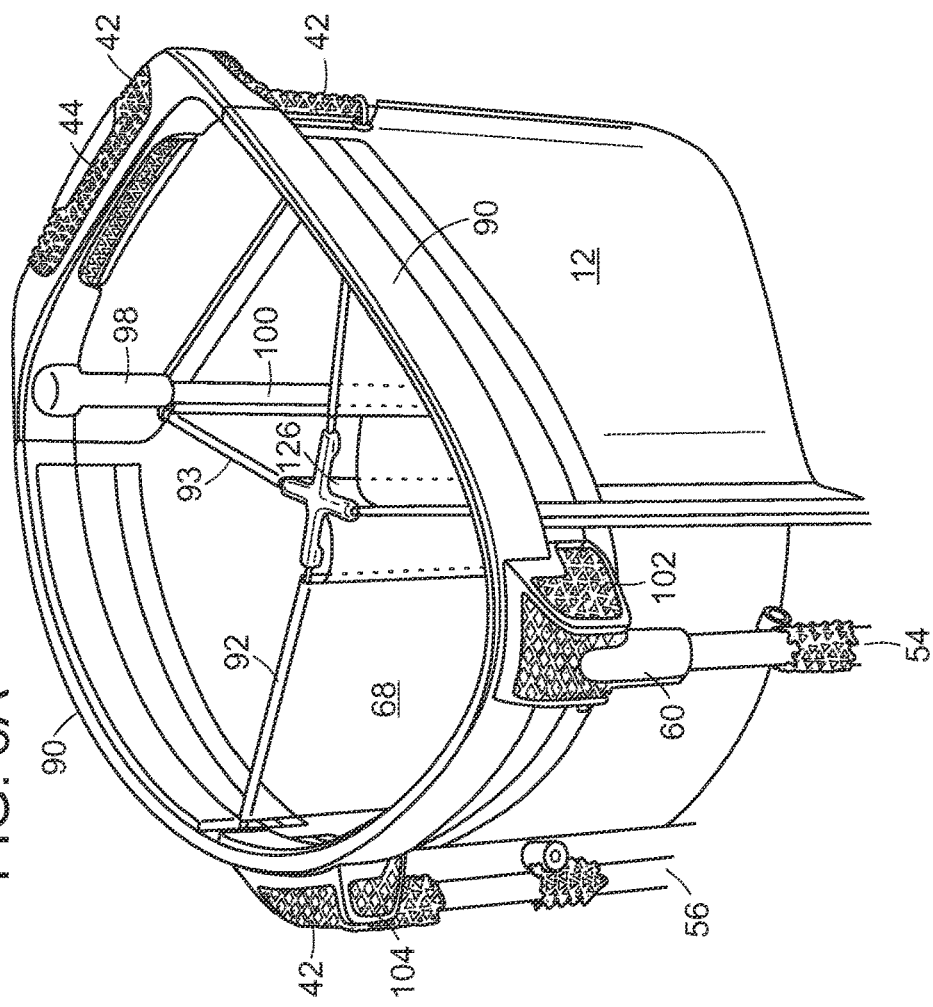
FIG. 6A is a perspective view of the top frame for a golf bag as shown in FIG. 6.
Figure 6:
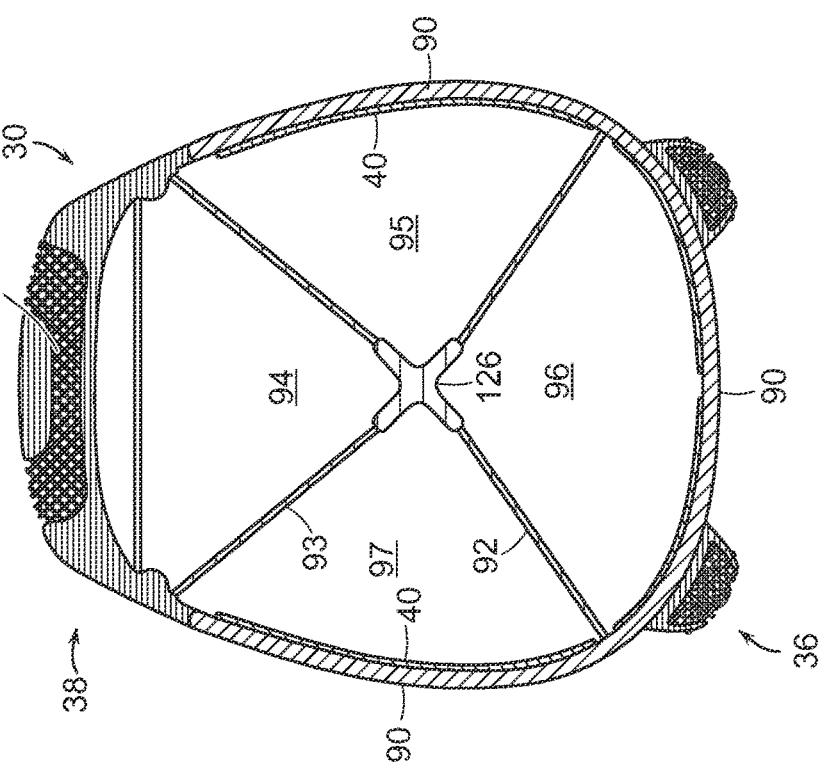
FIG. 6 is a top view of another embodiment of the top frame for a golf bag of this invention.

The top frame (30) may contain one or more dividers as described above. The top frame dividers separate the interior of the golf bag into different compartments for holding golf clubs. In FIGS. 6-6B, the bag is shown containing two dividers (92, 93) that extend across the top frame (30) to form four separate compartments (94, 95, 96, and 97). As described above, the top frame dividers (92, 93) may be constructed from woven webbing, cord, plastic, metal, fiber composite materials, hardwood, or combinations thereof. In FIGS. 6, 6A, and 6B, cord dividers (92, 93) are used in the top frame (30) as described further below.

Referring to FIG. 7, the open loop top frame assembly is shown in more detail. The top frame (30) includes the leg sub-assembly (36) and handle sub-assembly (38). The handle (44) is integral to the top cuff (30) and forms an opening where a person can insert his/her hand through and grasp the handle. The handle (44) may include two support post holders (98) for receiving support posts (100) that can be made from metal, carbon fiber composites, and the like.

The leg sub-assembly (36) may include two leg support members or leg-holding brackets (102, 104). The first leg-holding bracket (102) is adapted for receiving a first leg (54), and a second leg-holding bracket (104) is adapted for receiving a second leg (56). The leg support members (102, 104) (seats) may contain a pin (not shown) that is inserted between the walls of the support members. The legs (54, 56) may include upper connectors (58, 60) for coupling the legs to the leg support members (102, 104). The pin (not shown) that is inserted between the walls of the support members (102, 104) allow the legs (54, 56) to pivot outwardly so they can support the bag (10) in a tilted, standing position.

As shown in FIGS. 6-6B, a single cord divider is used in this embodiment of the top frame (30). The cord divider is a continuous and unitary cord loop. In this embodiment, the single, integral cord is configured to extend across the frame (30) in various directions to form separate club compartments. The cord divider segment (92) can be referred to as Cord Divider "A". This cord segment (92) has a first end (110) with a clip at its end for attaching this segment to the frame (30). The cord segment (92) also includes an opposing second end (112) with a clip at its end for attaching this segment to the frame (30). The point where the first end is attached to the frame can be referred to as the first frame attachment point. The point where the second end is attached to the frame can be referred to as a second frame attachment point. In this embodiment, the first and second cord segments (110, 112) are fastened to the frame (30) by small clips. As discussed above, it is recognized, however, that the first and second ends (110, 112) of this cord segment (92) can be attached to the frame (30) by any suitable fastening means such as, for example, loops, connectors, tie-downs, clasps, buckles, hook and loop fasteners and others as described above.

The second cord divider segment (93) can be referred to as Cord Divider "B". This cord segment (114) has a first end with a clip at its end for attaching this segment to the frame (30). The cord segment (93) also includes an opposing second end (116) with a clip at its end for attaching this segment to the frame (30). The point where the first segment is attached to the frame can be referred to as the third frame attachment point. The point where the second segment is attached to the frame can be referred to as a fourth frame attachment point. In this embodiment, the first and second segments (114, 116) are fastened to the frame (30) by small clips. As discussed above, it is recognized, however, that the first and second ends (114, 116) of this cord segment (93) can be attached to the frame (30) by any suitable fastening means.

The third cord divider segment (120) can be referred to as Cord Divider "C". This cord segment (12) has a first end (122) that passes through an aperture in the support post (98) of the bag. The cord segment (120) also includes an opposing second end (124) that passes through an aperture in the opposing support post (98) of the bag. The point where the first segment is attached to the support post (98) can be referred to as the fifth frame attachment point. The point where the second segment is attached to the support post (98) can be referred to as a sixth frame attachment point. In this embodiment, the first and second segments ends (122, 124) are fastened to the frame (30) by passing them through small apertures in the support posts (98). As discussed above, it is recognized, however, that the first and second ends (122, 124) of this cord segment (120) can be attached to the frame (30) by any suitable fastening means such as, for example, loops, connectors, tie-downs, clasps, buckles, hook and loop fasteners and others as described above.

As shown in FIGS. 6 and 7, Cord Dividers A and B extends through a connector piece (126). The Cord Dividers A and B pass through a connector piece (126) comprising a housing (128) containing two channels (130, 132). The connector piece (126) has an X-shaped structure with the channels (130, 132) criss-crossing each other. The channels (130, 132) are adapted for passing the cords through. Cord Divider A extends through one channel (132) in a first diagonal direction; and Cord Divider B extends through the second channel (130) in a second diagonal direction. In this manner, the Cord Dividers A and B criss-cross each other in the connector piece. That is, the Cord Dividers A and B form an X-shaped pattern.

In another embodiment, as discussed and illustrated further below, a single cord divider is used in the top frame (30). The cord divider is a continuous and unitary cord loop. In this embodiment, the single, integral cord is configured to extend across the frame (30) in various directions to form Cord Dividers A, B, and C.

Top Frame Having a Closed Loop

Referring to FIGS. 8 and 8A, in a third embodiment, the top frame (30) includes an outer wall (140) that forms a closed loop. That is, the outer wall (140) has a closed structure. The top frame (30) further includes a rear-side leg sub-assembly (36) and a front-side handle sub-assembly (38). The top frame (30) forms the top cuff (top collar) of the bag (10).

The outer wall (closed loop) (140) of the top frame (30) is preferably formed of a lightweight material having high mechanical strength such as, for example, aluminum, magnesium, aircraft aluminum, beryllium, carbon fiber, titanium, carbon fiber composites, metal alloys, and the like. These materials help reduce the overall weight of the golf bag (10). The inside surface of the outer wall (140) can be lined with a layer of fabric or foam padding material (40) as described above.

The top frame (30) may contain one or more dividers as described above. The top frame dividers separate the interior of the golf bag into different compartments for holding golf clubs. In FIGS. 8 and 8A, the bag is shown containing two dividers (62, 63) that extend across the top frame (30) to form four separate compartments (64, 65, 66, and 67). As described above, the top frame dividers may be constructed from woven webbing, cord, plastic, metal, fiber composite materials, hardwood, or combinations thereof. In FIGS. 8 and 8A, cord dividers (62, 63) are used in the top frame (30) as described further below.

Also, in FIGS. 8-8B, the top frame (30) includes a cord loop (142) that surrounds the cord dividers (62, 63). This cord loop (142) extends around the inside perimeter of the top frame (30). The cord loop (142) forms a cording suspension. The cord loop (142) is suspended from the inner surface of the outer wall (140) by cord pieces (145). That is, the cord loop (142) does not line the inner surface of the outer wall (140), but is coupled to and extends inwardly from the wall (140) by distinct cord pieces (145).

As shown in FIGS. 8, 8A, and 8B, multiple cord dividers are used in this embodiment of the top frame. Each cord divider is a separate and distinct component. The cord divider (62) can be referred to as Cord Divider "A". In general, this cord includes three segments. The cord (62) includes a first end segment (146) with a loop at its end for attaching this segment to the frame (30). The cord (62) also includes an opposing second end segment (148) with a loop at its end for coupling this segment to the frame (30). The point where the first segment (146) is attached to the frame (30) can be referred to as the first frame attachment point.

The point where the second segment (148) is attached to the frame (30) can be referred to as a second frame attachment point. In this embodiment, the first and second segments (146, 148) are fastened to the frame (30) by loops at their respective ends. It is recognized, however, that the first and second end segments (146, 148) can be attached to the frame (30) by any suitable fastening means as discussed above.

Cord Divider A also has a third segment, an intermediate segment (149), that extends through a connector piece (150). Referring to FIG. 8B, the connector piece (150) has a housing (152) with a single channel (154) containing openings (155, 156) on either end. The channel (154) is adapted for passing the cord through. The intermediate segment (149) of Cord Divider A passes through the channel (154).

The other cord piece (63) can be referred to as Cord Divider "B". In general, this cord also includes three segments. The cord (63) includes a first end segment (160) with a loop at its end for attaching this segment to the frame (30). The cord (63) also includes an opposing second end segment (162) with a loop at its end for attaching this segment to the frame (30). The point where the first segment is attached to the frame can be referred to as the third frame attachment point. The point where the second segment is attached to the frame can be referred to as a fourth frame attachment point. It is recognized, however, that the first and second end segments (160, 162) can be attached to the frame (30) by any other suitable fastening means as discussed above. Cord Divider "B" also contains a third segment, an intermediate segment (164), that extends through the connector piece (150).

Figure 9:
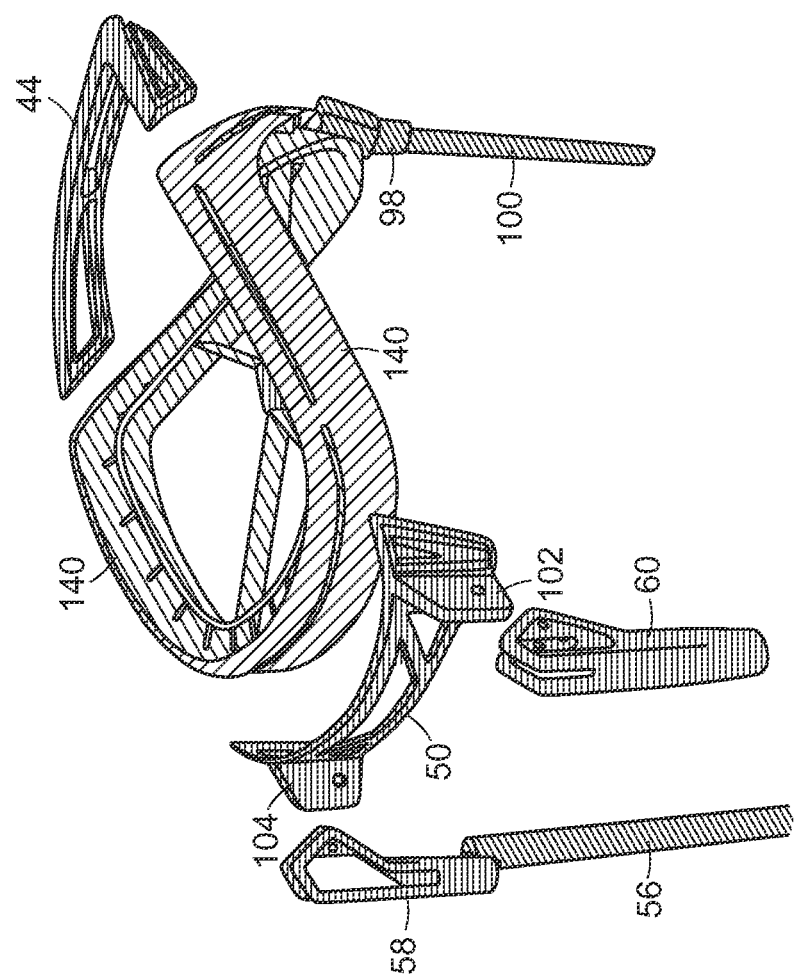
FIG. 9 is an exploded view of the top frame for a golf bag of this invention as shown in FIG. 8A showing the handle sub-assembly and leg sub-assembly in detail.

As shown in in FIG. 9, the handle (44) is integral to the top cuff (30) and forms an opening where a person can insert his/her hand through and grasp the handle. The handle (44) may include two support post holders (98) for receiving support posts (100) that can be made from metal, carbon fiber composites, and the like. In other embodiments, the top frame (30) may include a first support post holder (98) located at the front portion of the outer wall (140) for receiving a first support post (100). In this embodiment, only one support post holder (98) is used to support the handle assembly The leg sub-assembly (36) may include two leg support members (102, 104). The leg support members (102, 104) (seat) may contain a pin (not shown) that is inserted between the walls of the support members. The legs (54, 56) may include upper connectors (58, 60) for coupling the legs to the leg support members (102, 104). The pin (not shown) that is inserted between the walls of the support members (102, 104) allow the legs (54, 56) to pivot outwardly so they can support the bag (10) in a tilted, standing position.

Cord Dividers Forming Four Club Compartments

Figure 10:
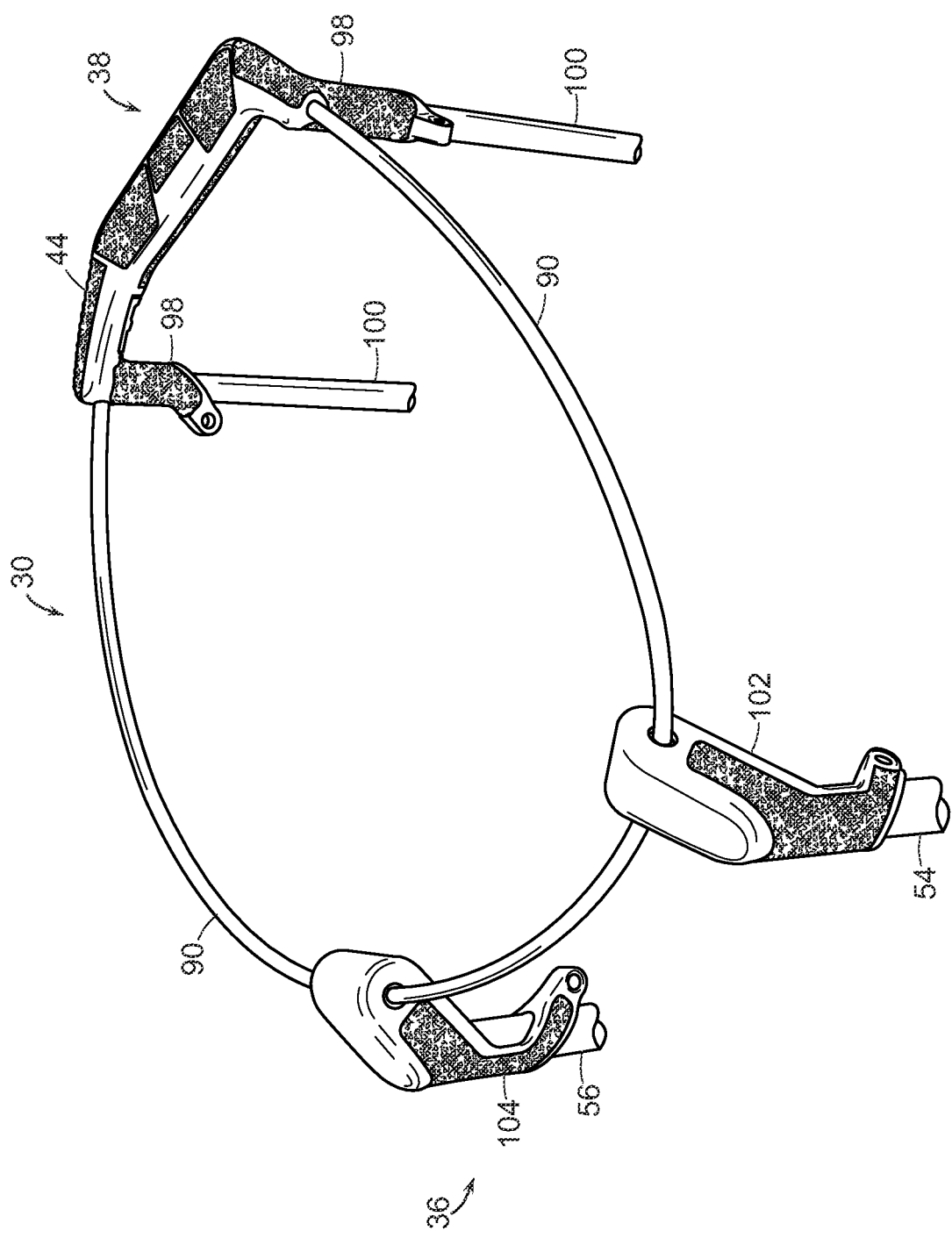
FIG. 10 is a perspective view of another embodiment of the top frame for a golf bag of this invention.
Figure 11:
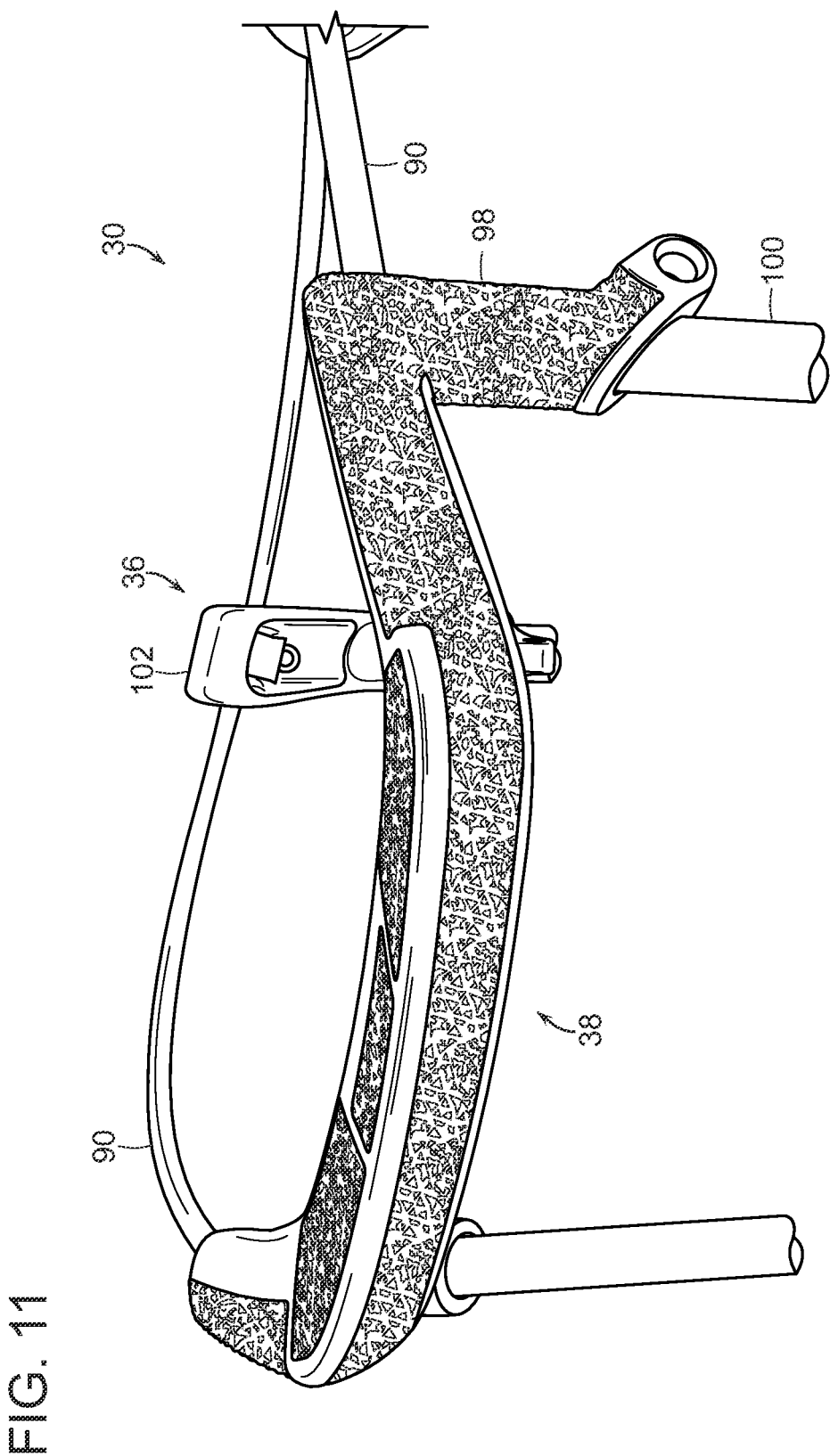
FIG. 11 is a second perspective view of the top frame for a golf bag as shown in FIG. 10 showing the handle sub-assembly in detail.
Figure 12:
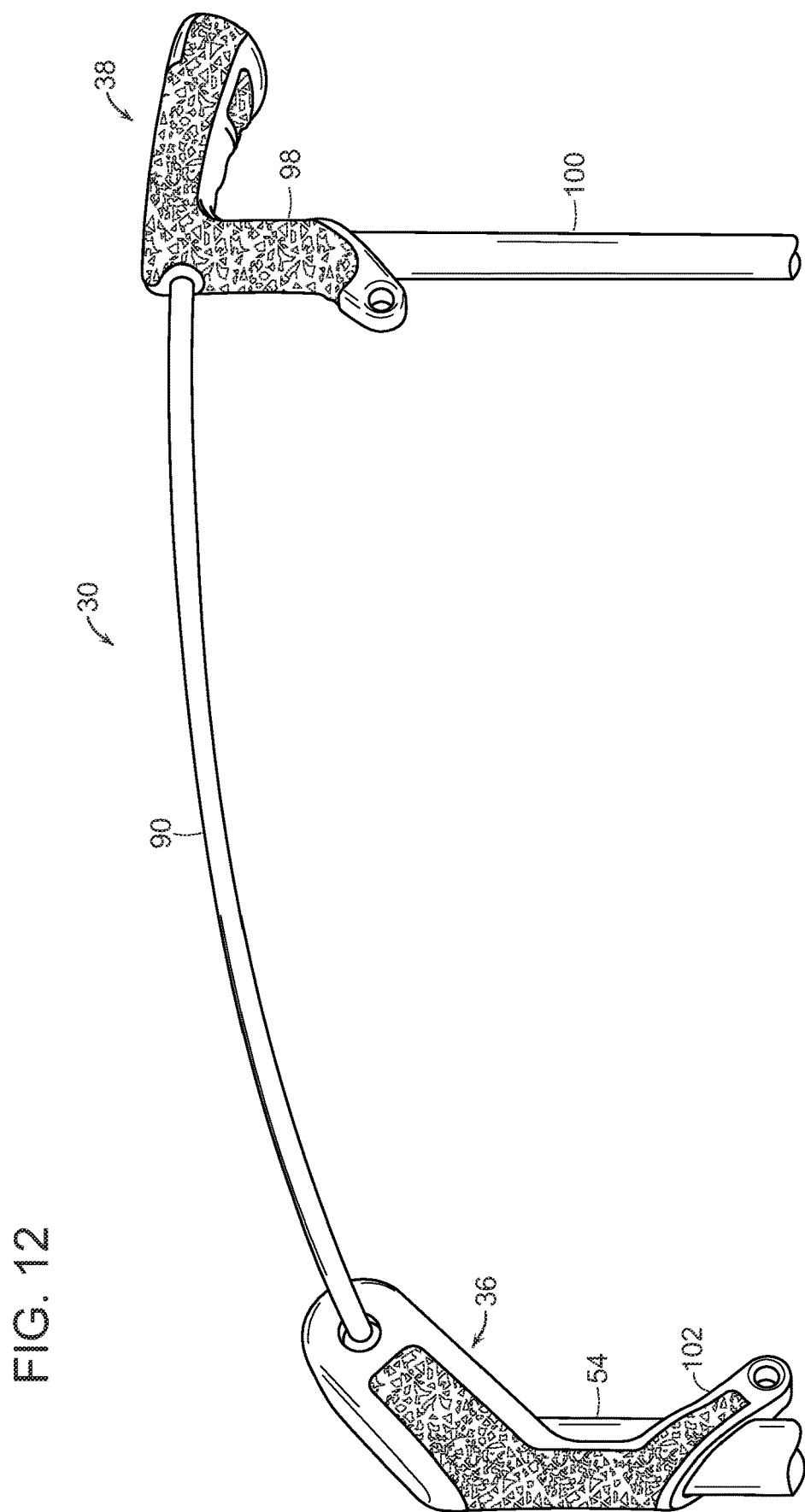
FIG. 12 is a side view of the top frame for a golf bag as shown in FIG. 10.

In a fourth embodiment, as shown in FIGS. 10-12, the top frame (30) includes an outer wall (90) that forms an open loop, which is connected to the front-side handle sub-assembly (38). That is, the outer wall (90) has a horseshoe-like structure. The free-ends of the horseshoe-like outer wall (90) are connected to the handle sub-assembly (38) to form the complete top frame (30). The top frame (30) further includes a rear-side leg sub-assembly (36). The top frame (30) forms the top cuff (top collar) of the golf bag (10).

The outer wall (90) (open loop) of the top frame (30) is preferably formed of a lightweight material having high mechanical strength such as, for example, aluminum, magnesium, aircraft aluminum, beryllium, carbon, titanium, carbon fiber composites, metal alloys, and the like. These materials help reduce the overall weight of the golf bag (10). The outer wall (90) can be in the form of a metal wire. The inside surface of the outer wall (90) can be lined with a layer of fabric or foam padding material (40) as described above.

Figure 13:
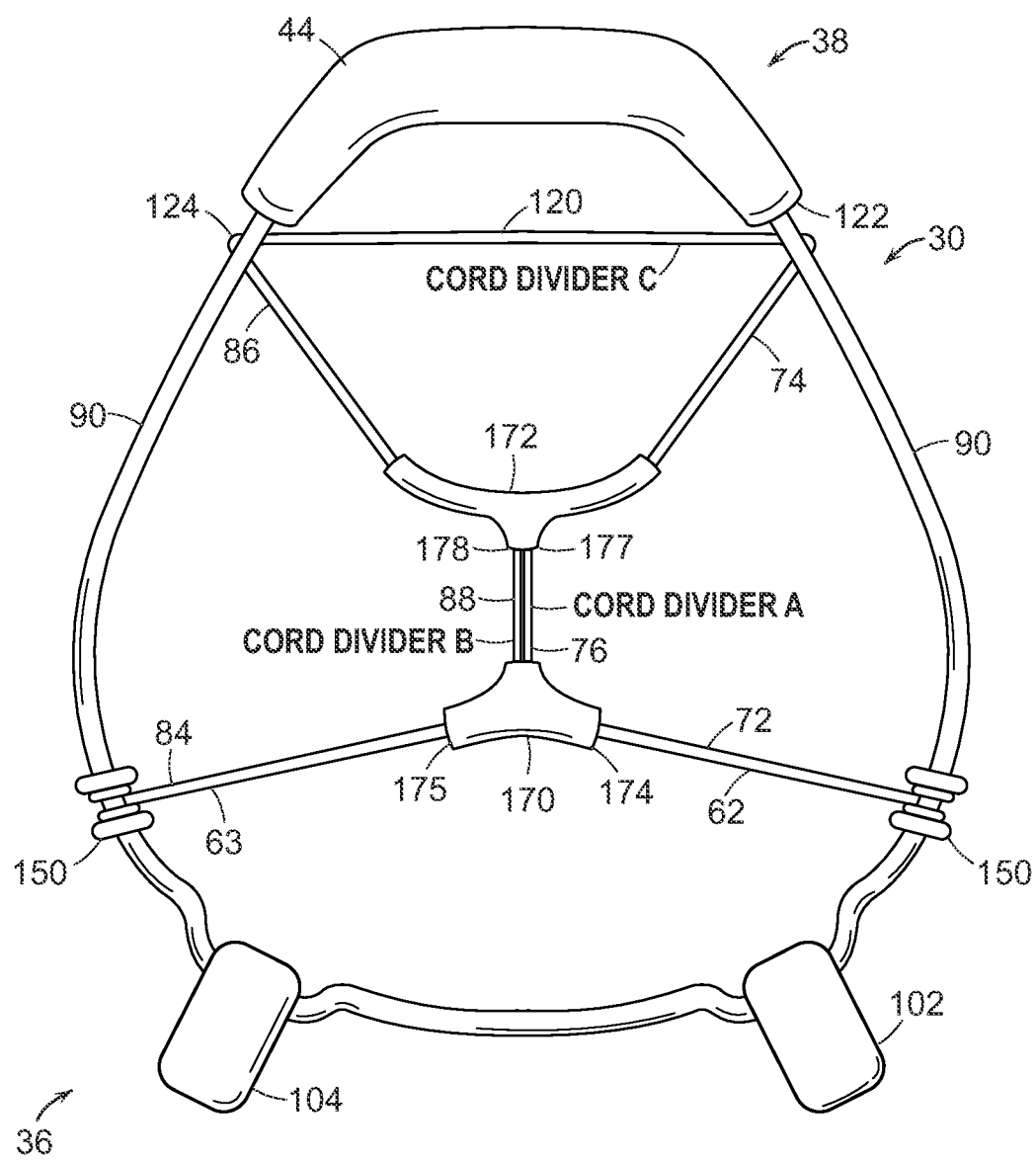
FIG. 13 is a top view of another embodiment of the top frame for a golf bag of this invention.

As shown in FIG. 13, a single cord divider (62) is used in this embodiment of the top frame (30). The cord divider is a continuous and unitary cord loop having cord segments generally referred to as Cord Divider "A", Cord Divider "B", and Cord Divider "C". The cord divider comprising Cord Dividers "A", "B", and "C" is a continuous and unitary cord loop. In this embodiment, the single, integral cord (62) is configured to extend across the frame (30) in various directions to form separate club compartments.

More particularly, referring to FIG. 13, the cord divider (62) can be generally referred to as Cord Divider "A." In general, Cord Divider A includes three segments. Cord Divider A includes a first end segment (72) with a clip (tie-down) at its end for attaching this segment to the top frame (30). Cord Divider A also includes a second end segment (74) with a loop at its end for attaching this segment to the frame (30). In one example, the second end segment (74) can be attached to the handle sub-assembly (38), for example, a handle support post-holder (not shown) which is used for receiving a support posts (not shown) as discussed above. The point where the first end segment (72) is attached to the top frame (30) can be referred to as the first frame attachment point. The point where the second end segment (74) is attached to the top frame (30) can be referred to as a second frame attachment point. In this embodiment, the first and second end segments (72, 74) are fastened to the top frame (30) by small clips and tie-off loops at their respective ends. It is recognized, however, that the first and second end segments (72, 74) can be attached to the top frame (30) by other means such as, for example, tie-downs, clasps, connectors, buckles, shackles, spring-loaded clips, snap buttons, laces, ties, button/button holes, hook and loop fastener fabric such as Velcro™, and any other suitable fastening means.

Cord Divider A also has a third segment, an intermediate segment (76), that extends through a first cord connector piece (170) and second cord connector piece (172). Referring to FIG. 13, the first cord connector piece (170) is shown having a two channels (174, 175). In this example, the first cord connector (170) has a T-shape-like structure, and the second cord connector (172) has a Y-shape-like structure. However, it is recognized that the cord connectors can have a wide variety of shapes, and these illustrated examples should not be considered as limiting. The channels (174, 175) are adapted for passing the cord through. The intermediate segment (76) of Cord Divider A passes through the first channel (174). Then, the intermediate segment (76) of Cord Divider A passes through the second connector piece (172) also having two channels (177, 178). The intermediate segment (76) is passed through the first channel (177) of the second connector piece (172) and then the end segment (74) of Cord Divider A is looped around the top frame (30).

The other cord divider (63) can be referred to as Cord Divider "B" as also shown in FIG. 13. In general, Cord Divider B also includes three segments. Cord Divider B includes a first end segment (84) with a clip (tie-down) at its end for attaching this segment to the top frame (30). Cord Divider B also includes a second end segment (86) with a loop at its end for attaching this segment to the top frame (30). In one example, the second end segment (86) can be attached to the handle sub-assembly (38), for example, a handle support post-holder (not shown) which is used for receiving a support posts (not shown) as discussed above. The point where the first end segment (84) is attached to the frame (30) can be referred to as the third frame attachment point. The point where the second end segment (86) is attached to the frame (30) can be referred to as a fourth frame attachment point. In this embodiment, the first and second end segments (84, 86) are fastened to the top frame (30) by small clips and tie-off loops at their respective ends. It is recognized, however, that the first and second end segments (84, 86) can be attached to the top frame (30) by any other suitable fastening means such as, for example, tie-downs, clasps, connectors, buckles, hook and loop fasteners and others as described above.

Cord Divider B also contains a third segment, an intermediate segment (88), that extends through the first connector piece (170) and the second connector piece (172). As discussed above, the intermediate segment (76) of Cord Divider A passes through one channel (174); and the intermediate segment (88) of Cord Divider B passes through the second channel (175) of the same connector piece (170). Next, the intermediate segment (88) of Cord Divider B is extended through the second connector piece (172) in a manner similar to Cord Divider A. The intermediate segment (88) is passed through the second channel (178) of the second connector piece (172) and then looped around the frame (30).

The third cord divider segment (120) can be referred to as Cord Divider "C". This cord segment (120) (Cord Divider C) has a first end segment (122) that is looped around the top frame (30). Cord Divider C also includes an opposing second end segment (124) that is looped around the opposing end of the top frame (30). The point where the first segment (122) is attached to the frame (30) can be referred to as the fifth frame attachment point. The point where the second segment (124) is attached to the frame (30) can be referred to as a sixth frame attachment point. In this embodiment, the first and second segments (122, 124) are fastened to the frame (30) by tie-off loops around the frame (30). As discussed above, it is recognized, however, that the first and second ends (122, 124) of this cord segment (120) can be attached to the frame (30) by any suitable fastening means such as, for example, clips, connectors, tie-downs, clasps, buckles, hook and loop fasteners and others as described above.

Figure 13A:
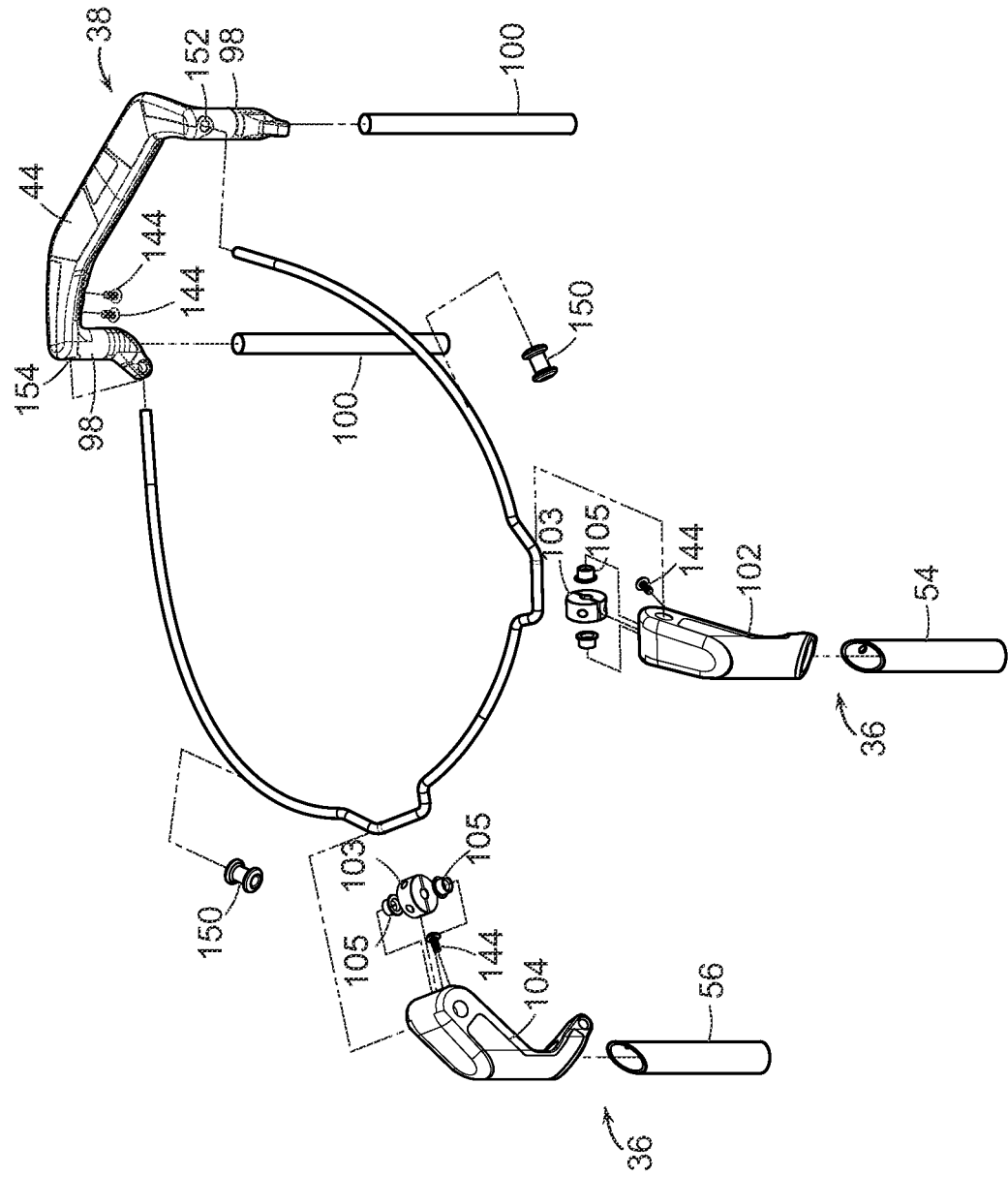
FIG. 13A is an exploded view of the top frame for a golf bag of this invention as shown in FIG. 13 showing the handle sub-assembly and leg sub-assembly in detail.

Turning to FIG. 13A, the leg and handle sub-assemblies (36, 38) are shown in more detail. The top frame (30) includes the leg sub-assembly (36) and handle sub-assembly (38). The handle (44) is integral to the top cuff (30) and forms an opening where a person can insert his/her hand through and grasp the handle. The handle (44) may include two support post holders (98) for receiving support posts (100) that can be made from metal, carbon fiber composites, and the like. The leg sub-assembly (36) may include two leg support members or leg-holding brackets (102, 104). The first leg-holding bracket (102) is adapted for receiving a first leg (54), and a second leg-holding bracket (104) is adapted for receiving a second leg (56). The leg-holding brackets (102, 104) and support post holders (98) for the handle (44) may contain set screws (144). The leg-holding brackets (102, 104) (seats) may contain a collar (103) with bushings (105) that is inserted between the walls of the support members. The collar (103) allows the legs (54, 56) to pivot outwardly so they can support the bag (10) in a tilted, propped-up position. Also, as discussed above, the wire frame may contain cord clips (tie-downs) (150). As shown in FIG. 13A, the wire frame is inserted into small openings (152, 154) in the handle (44) assembly.

Turning to FIGS. 14-15B, the lattice or sponge-like structures of the leg and handle sub-assemblies (36, 38) are shown in more detail. As discussed above, 3D printing can be used to form a lattice structure (180). The handle sub-assembly (38) includes the handle portion (44) and two support post-holders (98) for receiving support posts (not shown) as discussed above. The 3D printing systems can be used to produce internal and external sections of the handle and legs having a lattice structure (180). The other parts of the leg and handle sub-assemblies (36, 38) can have solid structures (185). The lattice (180) and solid (185) sections are precisely formed to balance the strength and weight for a given part of the handle or leg sub-assembly (36, 38). For example, the lattice beam thickness can be in the range of about 0.4 mm to about 0.8 mm depending upon the strength and weight requirements for the part. These lattice structures help provide a lightweight, high-performance top frame assembly (30), particularly the handle and leg sub-assemblies (36, 38). The voids or hollow areas in the lattice sections (180) provides weight reduction without sacrificing mechanical strength. In a sense, the lattice sections (180) act as struts to provide a reinforcing structure. This lightweight, reinforcing internal structure not only helps reduce the overall weight of the golf bag, but it also helps impart high durability and mechanical strength to the bag, particularly the top frame including the handle and leg sub-assemblies. The three-dimensional structures of the golf bags of this invention provide an optimized lightweight and durable bag. Although the three-dimensional structures are described primarily herein as being components of the top frame, for example, the handle or leg sub-assembly, it is recognized that other three-dimensional pieces for the golf bag can be made in accordance with this invention. For example, the ergonomic handle on the lower portion of the bag can be fabricated using an additive manufacturing method such as 3D printing in accordance with this invention. In other embodiments, the base and/or body of the bag can be made using 3D printing or other additive manufacturing methods. Such innovative manufacturing methods can be used to impart various organic designs having intricate shapes and patterns to the golf bag.

Figure 16:
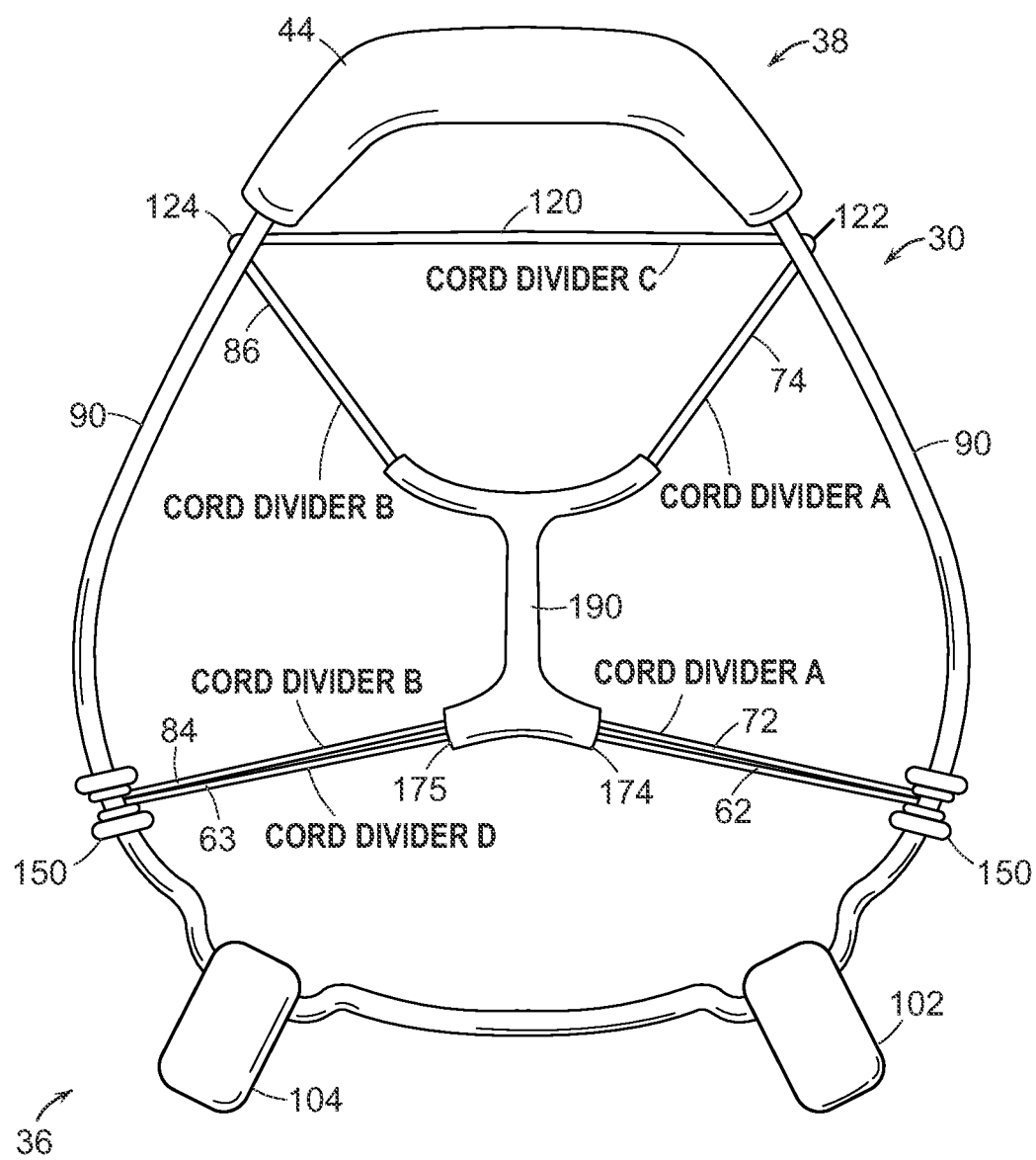
FIG. 16 is a top view of another embodiment of the top frame for a golf bag of this invention.

In FIG. 16, another embodiment of the top frame (30) is shown. Similar to the top frame shown in FIG. 13, this embodiment of the top frame (30) includes an outer wall (90) that forms an open loop, which is connected to the front-side handle sub-assembly (38). That is, the outer wall (90) has a horseshoe-like structure. Similar to the cord divider shown in FIG. 13, a single cord divider having cord segments referred to as Cord Divider "A", Cord Divider "B", and Cord Divider "C" is used in this embodiment of the top frame (30). The cord divider comprising Cord Dividers "A", "B", and "C" is a continuous and unitary cord loop. This single, integral cord is configured to extend across the frame (30) in various directions to form separate club compartments similar to the top frame shown in FIG. 13. The embodiment of the top frame shown in FIG. 16 further contains a second cord divider, referred to as Cord Divider "D" which is fastened to the top frame (30) by cord clips (tie-downs) (150).

As shown in FIG. 16, one cord divider can be referred to as Cord Divider "A" which generally includes three segments. Cord Divider A includes a first end segment (72) with a clip (tie-down) at its end for attaching this segment to the top frame (30). Cord Divider A also includes a second end segment (74) with a tie-off loop at its end for attaching this segment to the frame. In one example, the second end segment (74) can be attached to the handle sub-assembly (38), for example, a handle support post-holder (not shown) which is used for receiving a support posts (not shown) as discussed above. The point where the first segment (72) is attached to the top frame (30) can be referred to as the first frame attachment point. The point where the second segment (74) is attached to the top frame (30) can be referred to as a second frame attachment point. In this embodiment, the first and second end segments (72, 74) are fastened to the top frame (30) by small clips and loops at their respective ends. It is recognized, however, that the first and second end segments (72, 74) can be attached to the top frame (30) by other means such as, for example, tie-downs, clasps, connectors, buckles, shackles, spring-loaded clips, snap buttons, laces, ties, button/button holes, hook and loop fastener fabric such as Velcro™, and any other suitable fastening means.

Cord Divider A also has a third segment, an intermediate segment (not shown), that extends through a connector piece (190). Referring to FIG. 16, the unitary connector piece (190) is shown having two channels (174, 175). The channels (174, 175) are adapted for passing the cord segments through. The intermediate segment of Cord Divider A passes through the first channel (174). The end segment (74) exits the connector piece (190) and is looped around the top frame (30).

The other cord divider (63) can be referred to as Cord Divider "B" as also shown in FIG. 16. In general, Cord Divider B also includes three segments. Cord Divider B includes a first end segment (84) with a clip (tie-down) at its end for attaching this segment to the top frame (30). Cord Divider B also includes a second end segment (86) with a tie-off loop at its end for attaching this segment to the top frame (30). In one example, the second end segment (86) can be attached to the handle sub-assembly (38), for example, a handle support post-holder (not shown) which is used for receiving a support posts (not shown) as discussed above. The point where the first end segment (84) is attached to the frame (30) can be referred to as the third frame attachment point. The point where the second end segment (86) is attached to the frame (30) can be referred to as a fourth frame attachment point. In this embodiment, the first and second segments (84, 86) are fastened to the frame (30) by tie-off loops around the frame (30). It is recognized, however, that the first and second end segments (84, 86) can be attached to the top frame (30) by any other suitable fastening means such as, for example, tie-downs, clasps, connectors, buckles, hook and loop fasteners and others as described above.

Cord Divider B also contains a third segment, an intermediate segment (not shown), that extends through a cord connector piece (190). The unitary cord connector piece (190) is shown having a two entrance channels (174, 175). In this example, the cord connector (190) has a H-shape-like structure. However, it is recognized that the cord connector can have a wide variety of shapes, and this illustrated example should not be considered as limiting. As discussed above, the intermediate segment of Cord Divider A passes through one channel (174). The intermediate segment of Cord Divider B passes through the second channel (175) of the same connector piece (190) in a manner similar to Cord Divider A. Then, the end segment (86) of Cord Divider B exits the connector piece (190) and is looped around the top frame (30).

Similar to the top frame shown in FIG. 13, this embodiment of the top frame (30) also includes a third cord divider segment (120) that can be referred to as Cord Divider "C". This cord segment (120) (Cord Divider C) has a first end (122) that is looped around the top frame (30). Cord Divider C also includes an opposing second end (124) that is looped around the opposing end of the top frame (30). The point where the first end segment (122) is attached to the frame (30) can be referred to as the fifth frame attachment point.

The point where the second end segment (124) is attached to the frame (30) can be referred to as a sixth frame attachment point.

The embodiment of the top frame shown in FIG. 16 further contains another cord divider, referred to as Cord Divider "D" which is fastened to the top frame (30) by cord clips (tie-downs) (150). In general, Cord Divider D also includes three segments. Cord Divider D includes a first end segment (62) that is also tied-down to clip (150) for attaching this segment to the top frame (30). Cord Divider B also includes a second end segment (63) that is also tied-down to clip (150) for attaching this segment to the top frame (30). The point where the first end segment (62) is attached to the frame (30) can be referred to as the seventh frame attachment point. The point where the second end segment (63) is attached to the frame (30) can be referred to as an eighth frame attachment point. In this embodiment, the first and second end segments of Cord Divider D (62, 63) are fastened to the top frame (30) by small clips (tie-downs). It is recognized, however, that the first and second end segments (62, 63) can be attached to the top frame (30) by any other suitable fastening means such as, for example, clasps, connectors, buckles, hook and loop fasteners and others as described above.

With some conventional bags, it can be uncomfortable removing different clubs from the bag and returning them to the bag, because the top cuff is configured awkwardly. This constant organizing and fiddling of the clubs can be a distraction. Also, spending time and energy on carrying a conventional heavyweight bag can lead to fatigue and negatively affect playing performance on the golf course. As discussed above, the golf bag of this invention overcomes these drawbacks with conventional bags. The golf bag of this invention is durable, lightweight, comfortable to carry, and easy to use. The golf bag is durable enough to carry clubs, balls, and accessories, and yet, at the same time, the bag is lightweight and flexible. The golf bag has high mechanical strength and impact durability without sacrificing being lightweight. The golfer is able to balance this lightweight bag on their shoulders and distribute the weight of the bag evenly on their shoulders and back so he/she does not feel excess strain. The golfer can easily organize his/her clubs in the bag, walk comfortably on the course with the bag, and do other golf-specific actions. The golf bags of this invention have a stylish look and have many distinct features as discussed above.

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

It also should be understood the terms, "first", "second", "third", "fourth", "fifth", "sixth", "top", "bottom", "forward", "rear", "upper", "lower", "upward", "downward", "right", "left", "middle" "proximal", "distal", "lateral", "medial", "anterior", "posterior", and the like are arbitrary terms used to refer to one position of an element based on one perspective and should not be construed as limiting the scope of the invention.

All patents, publications, test procedures, and other references cited herein, including priority documents, are fully incorporated by reference to the extent such disclosure is not inconsistent with this invention and for all jurisdictions in which such incorporation is permitted. It is understood that the golf bags, golf bag components, golf bag assemblies and sub-assemblies, and materials described and illustrated herein represent only some embodiments of the invention. It is appreciated by those skilled in the art that various changes and additions can be made to such products and materials without departing from the spirit and scope of this invention. It is intended that all such embodiments be covered by the appended claims.

We claim:

1. A golf bag, comprising:
   an elongated tubular body for storing golf clubs, the tubular body having a top opening and a closed bottom, and
   a top frame mounted on the top opening, the top frame comprising:
      a handle sub-assembly having a central handle member with a first end and a second end, the handle sub-assembly extending from a front portion of the top frame;
      a leg sub-assembly having a central leg support member with a first end and a second end, the leg sub-assembly extending from a rear portion of the top frame; and
      a support structure comprising a continuous wire extending between the handle sub-assembly and the leg sub-assembly, wherein the support structure is configured as a pivot point for one or more legs of the golf bag;
   a right sidewall extending from the first end of the handle sub-assembly to the first end of the leg sub-assembly;
   a left sidewall extending from the second end of the handle sub-assembly to the second end of the leg sub-assembly so that there are two sidewalls opposing each other along the top frame; and
   a plurality of dividers, the dividers extending across the top frame and defining a plurality of golf club compartments, each configured to receive at least one club, wherein a cord segment of the plurality of dividers is looped around the continuous wire,
   wherein at least one portion of the top frame includes a printed lattice structure having a plurality of lattice beams with voids formed therebetween.

2. The golf bag of claim 1, wherein the sidewalls are formed from a metal material or a carbon fiber composite material.

3. The golf bag of claim 1, wherein the at least one portion of the top frame includes at least a portion of the handle sub-assembly.

4. The golf bag of claim 3, wherein the handle sub-assembly includes a first support post-holder located at the first end of the handle member for receiving a first support post, and a second support post-holder located at the second end of the handle member for receiving a second support post.

5. The golf bag of claim 1, wherein the at least one portion of the top frame includes at least a portion of the leg sub-assembly.

6. The golf bag of claim 5, wherein the leg sub-assembly includes a first leg support member located at the first end of the central leg support member for receiving a first leg, and a second leg support member located at the second end of the central leg support member for receiving a second leg.

7. The golf bag of claim 1, wherein the dividers are made from a cord material.

8. The golf bag of claim 1, wherein each lattice beam has a thickness of about 0.4 mm to about 0.8 mm.

9. The golf bag of claim 1, wherein the lattice structure is provided on an internal or external section of the at least one portion of the top frame.

10. The golf bag of claim 1, wherein the lattice structure includes at least one of circular, oval, triangular, square, pentagonal, hexagonal, heptagonal, and octagonal structures.

11. The golf bag of claim 1, wherein the golf bag comprises one or more support posts coupled to the handle sub-assembly, wherein the one or more support posts comprise an aperture for receiving and fastening a cord segment of the plurality of dividers to the top frame.

12. The golf bag of claim 1, wherein the golf bag comprises one or more support posts that extend below the top opening toward the closed bottom of the elongated tubular body.

13. The golf bag of claim 1, wherein the handle sub-assembly comprises one or more openings configured to receive the continuous wire, wherein the continuous wire is configured to extend between the first and second ends of both the handle sub-assembly and the leg sub-assembly.

14. The golf bag of claim 1, wherein the printed lattice structure comprises (i) a plurality of fused particles or (ii) a cured resin material.

15. A golf bag, comprising:
an elongated tubular body for storing golf clubs, the tubular body having a top opening and a closed bottom, and
a top frame mounted on the top opening, the top frame comprising:
a handle sub-assembly having a central handle member with a first end and a second end, the handle sub-assembly extending from a front portion of the top frame;
a leg sub-assembly comprising a first leg holding bracket and a second leg holding bracket for receiving one or more legs of the golf bag, the first and second leg-holding brackets extending from a rear portion of the top frame; and
a support structure comprising a continuous wire extending between the handle sub-assembly and the leg sub-assembly, wherein the support structure is configured as a pivot point for the one or more legs of the golf bag;
an outer wall extending from the first end of the handle and across the first and second leg holding brackets so that it forms an open loop along the top frame; and
a plurality of dividers, the dividers extending across the top frame and defining a plurality of golf club compartments, each configured to receive at least one club,
wherein a cord segment of the plurality of dividers is looped around the continuous wire,
wherein at least one portion of the top frame includes a printed lattice structure having a plurality of lattice beams with voids formed therebetween.

16. The golf bag of claim 15, wherein the outer wall is formed from a metal material or a carbon fiber composite material.

17. The golf bag of claim 15, wherein the at least one portion of the top frame includes at least a portion of the handle sub-assembly.

18. The golf bag of claim 15, wherein the at least one portion of the top frame includes at least one leg holding bracket.

19. A golf bag, comprising:
an elongated tubular body for storing golf clubs, the tubular body having a top opening and a closed bottom, and
a top frame mounted on the top opening, the top frame comprising an outer wall having front, side, and rear portions so that it forms a closed loop along the top frame;
a handle sub-assembly comprising a central handle member extending from the front portion of the outer wall;
a leg sub-assembly having a central leg support member with a first end and a second end, the leg sub-assembly extending from a rear portion of the outer wall; and
a support structure comprising a continuous wire extending between the handle sub-assembly and the leg sub-assembly, wherein the support structure is configured as a pivot point for one or more legs of the golf bag; and
a plurality of dividers, the dividers extending across the top frame and defining a plurality of golf club compartments, each configured to receive at least one club, wherein a cord segment of the plurality of dividers is looped around the continuous wire,
wherein at least one portion of the top frame includes a printed lattice structure having a plurality of lattice beams with voids formed therebetween.

20. The golf bag of claim 19, wherein the outer wall is formed from a metal material or a carbon fiber composite material.

21. The golf bag of claim 19, wherein the at least one portion of the top frame includes the central handle member.

22. The golf bag of claim 19, wherein the at least one portion of the top frame includes at least a portion of the leg sub-assembly.

* * * * *